United States Patent
Hausmann et al.

(10) Patent No.: US 12,145,344 B2
(45) Date of Patent: Nov. 19, 2024

(54) ORIENTED POLYETHYLENE FILMS AND ARTICLES COMPRISING THE SAME

(71) Applicant: Dow Global Technologies LLC, Midland, MI (US)

(72) Inventors: Karlheinz Hausmann, Auvernier (CH); Justice Alaboson, Rosharon, TX (US); Jian Wang, Missouri City, TX (US); Brayden E. Glad, Manvel, TX (US); Ronald Wevers, Terneuzen (NL); Sanjib Biswas, Manvel, TX (US); Andrew T. Heitsch, Angleton, TX (US); Mridula Kapur, Lake Jackson, TX (US); Didem Oner-Deliormanli, Bellaire, TX (US); Joshua B. Gaubert, Pearland, TX (US); Alexander Williamson, Rosharon, TX (US); Mehmet Demirors, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/754,753

(22) PCT Filed: Nov. 11, 2020

(86) PCT No.: PCT/US2020/059925
§ 371 (c)(1),
(2) Date: Apr. 11, 2022

(87) PCT Pub. No.: WO2021/126419
PCT Pub. Date: Jun. 24, 2021

(65) Prior Publication Data
US 2024/0316906 A1    Sep. 26, 2024

Related U.S. Application Data

(60) Provisional application No. 62/945,973, filed on Dec. 10, 2019.

(51) Int. Cl.
*B32B 27/08* (2006.01)
*B32B 27/30* (2006.01)
*B32B 27/32* (2006.01)
*B32B 27/34* (2006.01)

(52) U.S. Cl.
CPC ............ *B32B 27/08* (2013.01); *B32B 27/306* (2013.01); *B32B 27/32* (2013.01); *B32B 27/34* (2013.01); *B32B 2250/24* (2013.01); *B32B 2255/10* (2013.01); *B32B 2255/205* (2013.01); *B32B 2307/518* (2013.01); *B32B 2307/72* (2013.01); *B32B 2307/7376* (2023.05)

(58) Field of Classification Search
CPC .................. B32B 27/32; B32B 27/327; C08L 23/08–23/0892
See application file for complete search history.

(56) References Cited

U.S. PATENT DOCUMENTS

| | | | |
|---|---|---|---|
| 6,391,411 B1 | 5/2002 | Duckwall, Jr. et al. | |
| 6,534,166 B1 | 3/2003 | Pip et al. | |
| 6,540,949 B2 | 4/2003 | Pip et al. | |
| 7,659,343 B2 | 2/2010 | Wooster et al. | |
| 9,676,169 B2 | 6/2017 | Paulino | |
| 10,363,700 B2 | 7/2019 | Yun et al. | |
| 10,457,787 B2 | 10/2019 | Lin et al. | |
| 2003/0082392 A1 | 5/2003 | Bader | |
| 2013/0072632 A1* | 3/2013 | Wang .................. C08L 23/0815 525/240 |
| 2015/0086736 A1 | 3/2015 | Dotson et al. | |

(Continued)

FOREIGN PATENT DOCUMENTS

| | | |
|---|---|---|
| EP | 0405916 A1 | 1/1991 |
| EP | 0849073 A2 | 6/1998 |
| EP | 2291438 A2 | 3/2011 |
| EP | 2960270 A1 | 12/2015 |
| JP | 2000239404 A | 9/2000 |
| WO | 2013029223 A1 | 3/2013 |
| WO | 2016128865 A1 | 8/2016 |
| WO | 2016135590 A1 | 9/2016 |

(Continued)

OTHER PUBLICATIONS

Chatterjee, Polymer 55, 2014, p. 4102-4115.

(Continued)

*Primary Examiner* — Prashant J Khatri
(74) *Attorney, Agent, or Firm* — Jacob R. Graham

(57) ABSTRACT

The present invention relates to oriented, multilayer polyethylene films. In one aspect, a biaxially oriented, multilayer polyethylene film comprises at least one layer comprising: (1) a polyethylene-based composition that comprises: (a) at least 97% by weight, based on the total weight of the polyethylene-based composition, of a polyethylene composition comprising: (i) from 25 to 37 percent by weight of a first polyethylene fraction having a density in the range of 0.935 to 0.947 g/cm$^3$ and a melt index ($I_2$) of less than 0.1 g/10 minutes; and (ii) from 63 to 75 percent by weight of a second polyethylene fraction; and (b) 20 to 5000 ppm, based on the total weight of the polyethylene-based composition of a nucleating agent, wherein the nucleating agent comprises a calcium salt of 1,2-cyclohexanedicarboxylic acid or sodium 4-[(4-chlorobenzoyl) amino] benzoate; wherein the polyethylene composition has less than 0.10 branches per 1,000 carbon atoms when measured using $^{13}$C NMR, wherein the density of the polyethylene-based composition is at least 0.965 g/cm$^3$, and wherein the melt index ($I_2$) of the polyethylene-based composition is 0.5 to 10 g/10 minutes.

20 Claims, No Drawings

(56) References Cited

U.S. PATENT DOCUMENTS

| | | |
|---|---|---|
| 2015/0087758 A1 | 3/2015 | Qin et al. |
| 2015/0087759 A1 | 3/2015 | Dotson et al. |
| 2018/0099492 A1 | 4/2018 | Yun et al. |

FOREIGN PATENT DOCUMENTS

| | | |
|---|---|---|
| WO | 2018048580 A1 | 3/2018 |
| WO | 2018195681 A1 | 11/2018 |
| WO | 2019156733 A1 | 8/2019 |
| WO | 2020223688 A1 | 11/2020 |

OTHER PUBLICATIONS

Demseuse, Biaxial Stretching of Film, 2011, p. 36-46.
INNATET™ XUS 59910.08 Dow's Biaxially Oriented Polyethylene TF-BOPE Resin.
Neu, Film Processing Advances, Biaxial Oriented Film Technology, p. 194-229.
Seven, Polymer Engineering and Science, 2016, p. 541-554.
PCT/US2020/059925, International Search Report and Written Opinion with a mailing date of Jan. 25, 2021.

\* cited by examiner

ORIENTED POLYETHYLENE FILMS AND ARTICLES COMPRISING THE SAME

FIELD

The present invention relates to oriented, multilayer polyethylene films, to laminates comprising such films, and to articles comprising such films and laminates.

INTRODUCTION

As global interest solidifies in reducing packaging waste and making flexible packaging more sustainable, there is an increasing amount of effort to develop materials and technologies that would enhance the sustainability of flexible packaging. Flexible packaging film structures are often formed of multiple types of polymeric materials including, for example, polyethylene, polypropylene, ethylene vinyl alcohol, polyethylene terephthalate, polyamide and others. Such materials are typically combined to achieve a balance of properties that are beyond the reach of a single material type. However, due to the dissimilarity of these materials, the final package is typically not easy to recycle. Thus, there is also a movement towards single component structures (e.g., all polyethylene structures) to improve the recyclability profile. In the case of all polyethylene structures, for example, certain performance metrics (e.g., mechanical properties) will need to be enhanced to maintain the level of performance expected of these structures when formed from different polymeric materials, while improving recyclability. Thus, new resin and processing technologies will be needed to bridge performance deficiencies of polyethylene relative to other material types.

One such relatively new material technology on the processing side is biaxially oriented polyethylene (BOPE) films. Such BOPE films are formed by cast extrusion, and are then oriented in the machine direction (MD) followed by orientation in the transverse direction (TD) in a tenter frame. Alternatively this process can also be performed simultaneously. Due to the molecular architecture, microstructure and crystallization kinetics of polyethylene, it is often difficult to biaxially orient conventional polyethylene.

It would be desirable to have new polyethylene-based compositions that have good processability into biaxially oriented polyethylene films as well as new biaxially oriented polyethylene films having desired and/or improved properties. It would also be desirable to have new polyethylene-based compositions that have good processability into uniaxially oriented (e.g., machine direction oriented) polyethylene films as well as new uniaxially oriented polyethylene films having desired and/or improved properties.

SUMMARY

The present invention provides polyethylene-based compositions suitable for processing into biaxially oriented, multilayer polyethylene films, as well as biaxially oriented, multilayer polyethylene films having desired and/or improved properties. Such polyethylene-based compositions, in some embodiments, can advantageously expand the operating window for stretching films to provide biaxially oriented polyethylene films. For example, by expanding the operating window for biaxial orientation, higher density polyethylenes can be oriented which can lead to improved film stiffness. Other advantages can include, without limitation, better conversion and printability of films, improved optics (e.g., higher clarity and lower haze), improved barrier performance for metallized biaxially oriented polyethylene films, and improved processability on larger, wider tenter frames.

The present invention also provides polyethylene-based compositions suitable for processing into uniaxially oriented (e.g., machine direction oriented), multilayer polyethylene films, as well as uniaxially oriented, multilayer polyethylene films having desired and/or improved properties.

In one aspect, a biaxially oriented, multilayer polyethylene film comprises at least one layer comprising:
(1) a polyethylene-based composition that comprises:
   (a) at least 97% by weight, based on the total weight of the polyethylene-based composition, of a polyethylene composition comprising:
      (i) from 25 to 37 percent by weight of a first polyethylene fraction having a density in the range of 0.935 to 0.947 g/cm$^3$ and a melt index ($I_2$) of less than 0.1 g/10 minutes; and
      (ii) from 63 to 75 percent by weight of a second polyethylene fraction; and
   (b) 20 to 5000 ppm, based on the total weight of the polyethylene-based composition of a nucleating agent, wherein the nucleating agent comprises a calcium salt of 1,2-cyclohexanedicarboxylic acid or sodium 4-[(4-chlorobenzoyl) amino]benzoate;
wherein the polyethylene composition has less than 0.10 branches per 1,000 carbon atoms when measured using $^{13}$C NMR, wherein the density of the polyethylene-based composition is at least 0.965 g/cm$^3$, and wherein the melt index ($I_2$) of the polyethylene-based composition is 0.5 to 10 g/10 minutes.

In another aspect, the present invention relates to articles, such as food packages. In one aspect, an article comprises any of the biaxially oriented, multilayer polyethylene films disclosed herein.

In another aspect, the present invention relates to laminates and articles formed from such laminates. In some embodiments, a laminate comprises a first film comprising a polyethylene-based sealant film, polyethylene terephthalate, polypropylene, or polyamide; and an oriented, multilayer polyethylene film according to any of the embodiments disclosed herein, wherein the first film is laminated to the multilayer polyethylene film. In one aspect, an article comprises any of the laminates disclosed herein.

These and other embodiments are described in more detail in the Detailed Description.

DETAILED DESCRIPTION

Unless stated to the contrary, implicit from the context, or customary in the art, all parts and percents are based on weight, all temperatures are in ° C., and all test methods are current as of the filing date of this disclosure.

The term "composition," as used herein, refers to a mixture of materials which comprises the composition, as well as reaction products and decomposition products formed from the materials of the composition.

"Polymer" means a polymeric compound prepared by polymerizing monomers, whether of the same or a different type. The generic term polymer thus embraces the term homopolymer as defined hereafter, and the term interpolymer as defined hereinafter. Trace amounts of impurities (for example, catalyst residues) may be incorporated into and/or within the polymer. A polymer may be a single polymer, a polymer blend or a polymer mixture, including mixtures of polymers that are formed in situ during polymerization.

The term "homopolymer," as used herein, refers to polymers prepared from only one type of monomer with the understanding that trace amounts of impurities can be incorporated into the polymer structure.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The terms "olefin-based polymer" or "polyolefin", as used herein, refer to a polymer that comprises, in polymerized form, a majority amount of olefin monomer, for example ethylene or propylene (based on the weight of the polymer), and optionally may comprise one or more comonomers.

The term, "ethylene/α-olefin interpolymer," as used herein, refers to an interpolymer that comprises, in polymerized form, a majority amount (>50 mol %) of units derived from ethylene monomer, and the remaining units derived from one or more α-olefins. Typical α-olefins used in forming ethylene/α-olefin interpolymers are $C_3$-$C_{10}$ alkenes.

The term, "ethylene/α-olefin copolymer," as used herein, refers to a copolymer that comprises, in polymerized form, a majority amount (>50 mol %) of ethylene monomer, and an α-olefin, as the only two monomer types.

The term "α-olefin", as used herein, refers to an alkene having a double bond at the primary or alpha (a) position.

"Polyethylene" or "ethylene-based polymer" shall mean polymers comprising a majority amount (>50 mol %) of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); single-site catalyzed Linear Low Density Polyethylene, including both linear and substantially linear low density resins (m-LLDPE); ethylene-based plastomers (POP) and ethylene-based elastomers (POE); Medium Density Polyethylene (MDPE); and High Density Polyethylene (HDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homo-polymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems and chromium-based catalyst systems as well as single-site catalysts, including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy), and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or U.S. Pat. No. 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cm$^3$. "MDPE" is typically made using chromium or Ziegler-Natta catalysts or using single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy), and typically have a molecular weight distribution ("MWD") greater than 2.5.

The term "HDPE" refers to polyethylenes having densities greater than about 0.935 g/cm$^3$ and up to about 0.980 g/cm$^3$, which are generally prepared with Ziegler-Natta catalysts, chrome catalysts or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy).

The term "ULDPE" refers to polyethylenes having densities of 0.855 to 0.912 g/cm$^3$, which are generally prepared with Ziegler-Natta catalysts, chrome catalysts, or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy). ULDPEs include, but are not limited to, polyethylene (ethylene-based) plastomers and polyethylene (ethylene-based) elastomers. Polyethylene (ethylene-based) elastomers plastomers generally have densities of 0.855 to 0.912 g/cm$^3$.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those of skill in the art.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The present invention generally relates to oriented, multilayer polyethylene films. In some embodiments, such films are biaxially oriented. Such films are biaxially oriented using a tenter frame in some embodiments. In some embodiments, such films are uniaxially oriented in the machine direction. The oriented, multilayer polyethylene films utilize in at least one layer a polyethylene-based composition that can advantageously expand the operating window for stretching the films. For example, by expanding the operating window for biaxial orientation, higher density polyethylenes can be oriented which can lead to improved film stiffness. The oriented, multilayer polyethylene films, in some embodiments, can be used in packaging applications.

In one aspect, a biaxially oriented, multilayer polyethylene film comprises at least one layer comprising:
  (1) a polyethylene-based composition that comprises:
    (a) at least 97% by weight, based on the total weight of the polyethylene-based composition, of a polyethylene composition comprising:
      (i) from 25 to 37 percent by weight of a first polyethylene fraction having a density in the range of 0.935 to 0.947 g/cm$^3$ and a melt index ($I_2$) of less than 0.1 g/10 minutes; and
      (ii) from 63 to 75 percent by weight of a second polyethylene fraction; and
    (b) 20 to 5000 ppm, based on the total weight of the polyethylene-based composition of a nucleating agent, wherein the nucleating agent comprises a calcium salt of 1,2-cyclohexanedicarboxylic acid or sodium 4-[(4-chlorobenzoyl) amino]benzoate;
wherein the polyethylene composition has less than 0.10 branches per 1,000 carbon atoms when measured using $^{13}$C NMR, wherein the density of the polyethylene-based composition is at least 0.965 g/cm$^3$, and wherein the melt index ($I_2$) of the polyethylene-based composition is 0.5 to 10 g/10 minutes.

In another aspect, a biaxially oriented, multilayer polyethylene film comprises at least one layer comprising:
  (1) a polyethylene-based composition that comprises:
    (a) at least 97% by weight, based on the total weight of the polyethylene-based composition, of a polyethylene composition comprising:
      (i) from 25 to 37 percent by weight of a first polyethylene fraction having a density in the range of 0.935 to 0.947 g/cm$^3$ and a melt index ($I_2$) of less than 0.1 g/10 minutes; and
      (ii) from 63 to 75 percent by weight of a second polyethylene fraction; and
    (b) 20 to 5000 ppm, based on the total weight of the polyethylene-based composition of a nucleating agent, wherein the nucleating agent comprises sodium 4-[(4-chlorobenzoyl) amino] benzoate;
wherein the polyethylene composition has less than 0.10 branches per 1,000 carbon atoms when measured using $^{13}$C NMR, wherein the density of the polyethylene-based composition is at least 0.965 g/cm$^3$, and wherein the melt index ($I_2$) of the polyethylene-based composition is 0.5 to 10 g/10 minutes.

In another aspect, a biaxially oriented, multilayer polyethylene film comprises at least one layer comprising:
  (1) a polyethylene-based composition that comprises:
    (a) at least 97% by weight, based on the total weight of the polyethylene-based composition, of a polyethylene composition comprising:
      (i) from 25 to 37 percent by weight of a first polyethylene fraction having a density in the range of 0.935 to 0.947 g/cm$^3$ and a melt index ($I_2$) of less than 0.1 g/10 minutes; and
      (ii) from 63 to 75 percent by weight of a second polyethylene fraction; and
    (b) 20 to 5000 ppm, based on the total weight of the polyethylene-based composition of a nucleating agent, wherein the nucleating agent comprises a calcium salt of 1,2-cyclohexanedicarboxylic acid;
wherein the polyethylene composition has less than 0.10 branches per 1,000 carbon atoms when measured using $^{13}$C NMR, wherein the density of the polyethylene-based composition is at least 0.965 g/cm$^3$, and wherein the melt index ($I_2$) of the polyethylene-based composition is 0.5 to 10 g/10 minutes.

In some embodiments, the polyethylene-based composition comprises 20 to 2000 ppm of the nucleating agent based on the total weight of the polyethylene-based composition.

In some embodiments, the biaxially oriented film is oriented in the machine direction at a draw ratio from 2:1 to 9:1 and in the cross direction at a draw ratio from 2:1 to 11:1. The biaxially oriented film, in some embodiments, is oriented in the machine direction at a draw ratio from 2:1 to 6:1 and in the cross direction at a draw ratio from 2:1 to 9:1. In some embodiments, the biaxially oriented film is oriented in the machine direction at a draw ratio from 4:1 to 6:1 and in the cross direction at a draw ratio from 6:1 to 9:1.

In some embodiments, the biaxially oriented, multilayer polyethylene film further comprises a second polyethylene composition, wherein the second polyethylene composition exhibits at least two local peaks, excluding the soluble fraction, in comonomer distribution measured by crystallization elution fractionation, wherein one of the peaks is between 40° C. and 95° C. The second polyethylene composition, in some embodiments, exhibits at least two local peaks, excluding the soluble fraction, in comonomer distribution measured by crystallization elution fractionation, wherein one of the peaks is between 40° C. and 90° C. In some embodiments, the second polyethylene composition exhibits at least two local peaks, excluding the soluble fraction, in comonomer distribution measured by crystallization elution fractionation, wherein one of the peaks is between 40° C. and 87° C. The second polyethylene composition in some embodiments has a density from 0.928 to 0.940 g/cm$^3$. In some embodiments, the layer comprising the polyethylene-based composition further comprises the second polyethylene composition.

In some embodiments, the overall density of the biaxially oriented, multilayer film is from 0.931 to 0.975 g/cm$^3$.

In some embodiments, the biaxially oriented, multilayer film has a thickness of 5 to 50 microns.

The biaxially oriented, multilayer film, some embodiments, further comprises a layer that comprises polyamide or ethylene vinyl alcohol.

In some embodiments, the biaxially oriented, multilayer film further comprises an outer layer that is a sealant layer.

In some embodiments, the biaxially oriented, multilayer film further comprises a layer comprising a metal deposited on an outer layer of the film, wherein the metal comprises Al, Zn, Au, Ag, Cu, Ni, Cr, Ge, Se, Ti, Sn, Si, Mg, or oxides thereof.

In another aspect, the present invention relates to articles, such as food packages. In one aspect, an article comprises any of the inventive biaxially oriented, multilayer polyethylene films disclosed herein.

In another aspect, the present invention relates to laminates and articles formed from such laminates. In some embodiments, a laminate comprises a first film comprising a polyethylene-based sealant film, polyethylene terephthalate, polypropylene, or polyamide; and a biaxially oriented, multilayer polyethylene film according to any of the embodiments disclosed herein, wherein the first film is laminated to the multilayer polyethylene film. In one aspect, an article comprises any of the laminates disclosed herein.

In another aspect, the present invention relates to a uniaxially oriented, multilayer polyethylene film that comprises:
at least one layer comprising:
(1) a polyethylene-based composition that comprises:
(a) at least 97% by weight, based on the total weight of the polyethylene-based composition, of a polyethylene composition comprising:
(i) from 25 to 37 percent by weight of a first polyethylene fraction having a density in the range of 0.935 to 0.947 g/cm$^3$ and a melt index (I$_2$) of less than 0.1 g/10 minutes; and
(ii) from 63 to 75 percent by weight of a second polyethylene fraction; and
(b) 20 to 5000 ppm, based on the total weight of the polyethylene-based composition of a nucleating agent, wherein the nucleating agent comprises a calcium salt of 1,2-cyclohexanedicarboxylic acid or sodium 4-[(4-chlorobenzoyl) amino]benzoate;
wherein the polyethylene composition has less than 0.10 branches per 1,000 carbon atoms when measured using $^{13}$C NMR, wherein the density of the polyethylene-based composition is at least 0.965 g/cm$^3$, and wherein the melt index (I$_2$) of the polyethylene-based composition is 0.5 to 10 g/10 minutes. In some embodiments, the film is oriented in the machine direction.

In another aspect, the present invention relates to a uniaxially oriented, multilayer polyethylene film that comprises:
at least one layer comprising:
(1) a polyethylene-based composition that comprises:
(a) at least 97% by weight, based on the total weight of the polyethylene-based composition, of a polyethylene composition comprising:
(i) from 25 to 37 percent by weight of a first polyethylene fraction having a density in the range of 0.935 to 0.947 g/cm$^3$ and a melt index (I$_2$) of less than 0.1 g/10 minutes; and
(ii) from 63 to 75 percent by weight of a second polyethylene fraction; and
(b) 20 to 5000 ppm, based on the total weight of the polyethylene-based composition of a nucleating agent, wherein the nucleating agent comprises a calcium salt of 1,2-cyclohexanedicarboxylic acid;
wherein the polyethylene composition has less than 0.10 branches per 1,000 carbon atoms when measured using $^{13}$C NMR, wherein the density of the polyethylene-based composition is at least 0.965 g/cm$^3$, and wherein the melt index (I$_2$) of the polyethylene-based composition is 0.5 to 10 g/10 minutes. In some embodiments, the film is oriented in the machine direction.

In another aspect, the present invention relates to a uniaxially oriented, multilayer polyethylene film that comprises:
at least one layer comprising:
(1) a polyethylene-based composition that comprises:
(a) at least 97% by weight, based on the total weight of the polyethylene-based composition, of a polyethylene composition comprising:
(i) from 25 to 37 percent by weight of a first polyethylene fraction having a density in the range of 0.935 to 0.947 g/cm$^3$ and a melt index (I$_2$) of less than 0.1 g/10 minutes; and
(ii) from 63 to 75 percent by weight of a second polyethylene fraction; and
(b) 20 to 5000 ppm, based on the total weight of the polyethylene-based composition of a nucleating agent, wherein the nucleating agent comprises sodium 4-[(4-chlorobenzoyl) amino] benzoate;
wherein the polyethylene composition has less than 0.10 branches per 1,000 carbon atoms when measured using $^{13}$C NMR, wherein the density of the polyethylene-based composition is at least 0.965 g/cm$^3$, and wherein the melt index (I$_2$) of the polyethylene-based composition is 0.5 to 10 g/10 minutes. In some embodiments, the film is oriented in the machine direction.

In some embodiments, the uniaxially oriented film is oriented in the machine direction at a draw ratio from 4:1 to 20:1. The uniaxially oriented film, in some embodiments, is oriented in the machine direction at a draw ratio from 4:1 to 16:1. In some embodiments, the uniaxially oriented film is oriented in the machine direction at a draw ratio from 4:1 to 12:1. In some embodiments, the uniaxially oriented film is oriented in the machine direction at a draw ratio from 4:1 to 10:1. In some embodiments, the uniaxially oriented film is oriented in the machine direction at a draw ratio from 4:1 to 9:1.

In some embodiments, the uniaxially oriented, multilayer polyethylene film further comprises a second polyethylene composition, wherein the second polyethylene composition exhibits at least two local peaks, excluding the soluble fraction, in comonomer distribution measured by crystallization elution fractionation, wherein one of the peaks is between 40° C. and 95° C. In some embodiments, the fraction that forms the peak between 40° C. and 95° C. is up 50 weight percent of the composition as measured by crystallization elution fractionation. The second polyethylene composition, in some embodiments, exhibits at least two local peaks, excluding the soluble fraction, in comonomer distribution measured by crystallization elution fractionation, wherein one of the peaks is between 40° C. and 90° C. In some embodiments, the second polyethylene composition exhibits at least two local peaks, excluding the soluble fraction, in comonomer distribution measured by crystallization elution fractionation, wherein one of the peaks is between 40° C. and 87° C. The second polyethylene composition in some embodiments has a density from 0.928 to 0.940 g/cm$^3$. In some embodiments, the layer comprising the polyethylene-based composition further comprises the second polyethylene composition.

In some embodiments, the overall density of the uniaxially oriented, multilayer film is from 0.931 to 0.975 g/cm$^3$.

In some embodiments, the uniaxially oriented, multilayer film has a thickness of 5 to 50 microns.

The uniaxially oriented, multilayer film, some embodiments, further comprises a layer that comprises polyamide or ethylene vinyl alcohol.

In some embodiments, the uniaxially oriented, multilayer film further comprises an outer layer that is a sealant layer.

In some embodiments, the uniaxially oriented, multilayer film further comprises a layer comprising a metal deposited on an outer layer of the film, wherein the metal comprises Al, Zn, Au, Ag, Cu, Ni, Cr, Ge, Se, Ti, Sn, Si, Mg, or oxides thereof.

In another aspect, the present invention relates to articles, such as food packages. In one aspect, an article comprises any of the inventive uniaxially oriented, multilayer polyethylene films disclosed herein.

In another aspect, the present invention relates to laminates and articles formed from such laminates. In some embodiments, a laminate comprises a first film comprising a polyethylene-based sealant film, polyethylene terephthalate, polypropylene, or polyamide; and a uniaxially oriented, multilayer polyethylene film according to any of the embodiments disclosed herein, wherein the first film is laminated to the multilayer polyethylene film. In one aspect, an article comprises any of the laminates disclosed herein.

Polyethylene Composition

As discussed above, the biaxially oriented (or uniaxially oriented), multilayer films of the present invention include at least one layer comprising a polyethylene-based composition having certain properties. The polyethylene-based compositions used in embodiments of the present invention comprise a polyethylene composition comprising (i) from 25 to 37 percent by weight of a first polyethylene fraction having a density in the range of 0.935 to 0.947 g/cm$^3$ and a melt index ($I_2$) of less than 0.1 g/10 minutes; and (ii) from 63 to 75 percent by weight of a second polyethylene fraction, wherein the polyethylene composition has less than 0.10 branches per 1,000 carbon atoms when measured using $^{13}$C NMR, wherein the density of the polyethylene-based composition is at least 0.965 g/cm$^3$, and wherein the melt index ($I_2$) of the polyethylene-based composition is 0.5 to 10 g/10 minutes.

In some embodiments, the polyethylene-based composition has a melt index ($I_2$) of 2.5 g/10 minutes or less.

In some embodiments, the polyethylene composition comprises from 25 to 37 percent by weight of the first polyethylene fraction having a density in the range of 0.940 to 0.947 g/cm$^3$ and from 63 to 75 percent by weight of the second polyethylene fraction having a density of 0.970 g/cm$^3$ or greater.

The polyethylene composition may comprise a combination of two or more embodiments as described herein.

In one embodiment, the polyethylene composition has a density of at least 0.965 g/cm$^3$. In some embodiments, the polyethylene composition has a density of at least 0.968 g/cm$^3$. The polyethylene composition, in some embodiments, has a density of up to 0.976 g/cm$^3$. In some embodiments, the polyethylene composition has a density in the range of 0.965 to 0.976 g/cm$^3$, for example from 0.965 to 0.970, or from 0.967 to 0.969, or from 0.965 to 0.970 g/cm$^3$. For example, the density can be from a lower limit of 0.965 or 0.967 g/cm$^3$, to an upper limit of 0.970, 0.972, 0.975, or 0.976 g/cm$^3$.

The polyethylene composition has a melt index ($I_2$ or 12; at 190° C./2.16 kg) from 0.5 to 10 g/10 minutes. For example, the melt index ($I_2$ or 12; at 190° C./2.16 kg) can be from a lower limit of 0.5, 0.7, 0.9, 1.0, 1.1, 1.2, 1.5, 2, 3, 4, or 5 g/10 minutes, to an upper limit of 1.5, 2, 2.5, 3, 4, 5, 6, 7, 8, 9, or 10 g/10 minutes. In some embodiments, the polyethylene composition has a melt index ($I_2$) from 0.5 to 5 g/10 minutes, or from 0.5 to 2.5 g/10 minutes, or from 0.7 to 3 g/10 minutes, or from 1.0 to 2.0 g/10 minutes, or from 1.0 to 1.5 g/10 minutes.

In some embodiments, the polyethylene composition has a melt index ratio ($I_{10}/I_2$) of 10 or more. The polyethylene composition has a melt index ratio ($I_{10}/I_2$) of up to 17 in some embodiments. In some embodiments, the polyethylene composition has a melt index ratio ($I_{10}/I_2$) of 10 to 17. The polyethylene composition has a melt index ratio ($I_{10}/I_2$) of 12 to 17 in some embodiments.

The polyethylene composition has low levels of branching. The polyethylene composition has less than 0.10 branches per 1,000 carbon atoms when measured using $^{13}$C NMR in some embodiments. The polyethylene composition, in some embodiments has less than 0.07 branches per 1,000 carbon atoms when measured using $^{13}$C NMR. The polyethylene composition has less than 0.05 branches per 1,000 carbon atoms when measured using $^{13}$C NMR in some embodiments. In some embodiments, the polyethylene composition has less than 0.03 branches per 1,000 carbon atoms when measured using $^{13}$C NMR.

In some embodiments, the polyethylene composition has low levels of non-vinyl unsaturations. In some embodiments, the polyethylene composition has less than 25 non-vinyl unsaturations per 1 million carbons when measured using $^1$H NMR. The polyethylene composition, in some embodiments, has less than 20 non-vinyl unsaturations per 1 million carbons when measured using $^1$H NMR.

Without wishing to be bound by theory, it is believed that the combination of low levels of branching and low levels of non-vinyl unsaturation in the polyethylene compositions provide a greater amount of crystallinity in the polyethylene compositions, thereby improving its barrier properties when formed into a film.

In one embodiment, the polyethylene composition has a ZSVR value of less than 2.0, or from 1.0 to 2.0, or from 1.2 to 1.8, or from 1.3 to 1.7.

In one embodiment, the polyethylene composition has a molecular weight distribution, expressed as the ratio of the weight average molecular weight to number average molecular weight ($M_w/M_n$; as determined by conv. GPC) in the range of from 8.0 to 14.0. For example, the molecular weight distribution ($M_w/M_n$) can be from a lower limit of 8.0, 8.5, 9.0, or 9.5 to an upper limit of 10.0, 11.0, 11.5, 12.0, 12.5, 13.0, 13.5, or 14.0. In some embodiments, the $M_w/M_n$ is from 10.0 to 12.0.

In one embodiment, the polyethylene composition has a number average molecular weight ($M_n$; as determined by conv. GPC) in the range from 8,000 to 20,000 g/mole. For example, the number average molecular weight can be from a lower limit of 8,000, 9,000, 10,000, or 11,000 g/mole, to an upper limit of 12,000, 13,000, 15,000, or 20,000 g/mole.

In one embodiment, the polyethylene composition has a weight average molecular weight ($M_w$; as determined by conv. GPC) in the range from 100,000 to 125,000 g/mole. For example, the weight average molecular weight can be from a lower limit of 100,000, 105,000, or 110,000 g/mole, to an upper limit of 115,000, 120,000, or 124,000 g/mole.

In one embodiment, the polyethylene composition has a z average molecular weight ($M_z$; as determined by conv. GPC) of at least 350,000 g/mole, such as in the range from 350,000 to 600,000 g/mole. For example, the z average molecular weight can be from a lower limit of 350,000, 375,000, 400,000, 405,000, or 410,000 g/mole, to an upper limit of 420,000, 425,000, 450,000, 475,000, 500,000, 550,000, or 600,000 g/mole.

In one embodiment, the polyethylene composition has a $M_z/M_w$ ratio (each as determined by conv. GPC) of greater than 3.0. The polyethylene composition has a $M_z/M_w$ ratio (each as determined by conv. GPC) of greater than 3.5 in some embodiments. The $M_z/M_w$ can be from 3.0 to 4.0 in some embodiments, or from 3.5 to 4.5 in some embodiments, or from 3.5 to 4.0 in some embodiments.

In one embodiment, the polyethylene composition has a ZSVR of less than 2.0 and a $M_z/M_w$ ratio (each as determined by conv. GPC) of greater than 3.0. In another embodiment, the polyethylene compositions has a ZSVR of less than 2.0 and a $M_z/M_w$ ratio (each as determined by conv. GPC) of greater than 3.5.

The polyethylene composition preferably comprises ethylene-based polymers formed in the absence of comonomers. In some embodiments, the polyethylene composition comprises at least 99% by weight ethylene-based polymers formed in the absence of comonomers. In some embodiments, the polyethylene composition comprises at least 99% by weight polymers comprising a majority amount (>99 mol %) of units which have been derived from ethylene monomer.

The polyethylene compositions used in polyethylene-based compositions of the present invention comprise two fractions of polyethylenes.

The first polyethylene fraction has a density of 0.935 to 0.947 g/cm³. In some embodiments, the first polyethylene fraction has a density of 0.940 to 0.947 g/cm³. The first polyethylene fraction has a melt index ($I_2$) of less than 0.1 g/10 minutes. In some embodiments, the first polyethylene fraction has a melt index ($I_2$) of 0.01 g/10 minutes or greater. The first polyethylene fraction has a melt index from 0.05 to 0.1 g/10 minutes in some embodiments. The first polyethylene fraction, in some embodiments, has less than 0.10 branches per 1,000 carbon atoms when measured using $^{13}C$ NMR.

In some embodiments, the second polyethylene fraction has a density of 0.970 g/cm³ or more. In some embodiments, the first polyethylene fraction has a density of 0.940 to 0.947 g/cm³, and the second polyethylene fraction has a density of 0.970 g/cm³ or more. In some embodiments, the second polyethylene fraction has a melt index ($I_2$) of at least 100 g/10 minutes. In some embodiments, the second polyethylene fraction has a melt index ($I_2$) of at least 100 g/10 minutes and up to 10,000 g/10 minutes or more. The second polyethylene fraction has a melt index ($I_2$) of at least 100 g/10 minutes and up to 10,000 g/10 minutes, in some embodiments. The second polyethylene fraction has a melt index ($I_2$) of at least 100 g/10 minutes and up to 1,000 g/10 minutes, in some embodiments.

In some embodiments, the ratio of the melt index ($I_2$) of the second polyethylene fraction to the melt index ($I_2$) of the first polyethylene fraction is at least 1,000.

The polyethylene composition comprises from 25 to 37 percent by weight of the first polyethylene fraction and from 63 to 75 percent by weight of the second polyethylene fraction, based on the total weight of the polyethylene composition. In some embodiments, the polyethylene composition comprises 30 to 37 percent by weight of the first polyethylene fraction and 63 to 70 percent by weight of the second polyethylene fraction, based on the total weight of the polyethylene composition.

The polyethylene-based composition comprises at least 97% by weight of the polyethylene composition, based on the total weight of the polyethylene-based composition. In some embodiments, the polyethylene-based composition comprises up to 99% by weight of the polyethylene composition, based on the total weight of the polyethylene-based composition. The polyethylene-based composition, in some embodiments, comprises from 97% to 98% by weight of the polyethylene composition, based on the total weight of the polyethylene-based composition.

The following discussion focuses on preparation of the polyethylene composition for use in embodiments of the present invention.

Polymerization

Any conventional polymerization processes may be employed to produce the polyethylene composition. Such conventional polymerization processes include, but are not limited to, slurry polymerization processes, solution polymerization process, using one or more conventional reactors e.g. loop reactors, isothermal reactors, stirred tank reactors, batch reactors in parallel, series, and/or any combinations thereof. The polyethylene composition may, for example, be produced via solution phase polymerization process using one or more loop reactors, isothermal reactors, and combinations thereof.

In general, the solution phase polymerization process occurs in one or more well-mixed reactors such as one or more isothermal loop reactors or one or more adiabatic reactors at a temperature in the range of from 115 to 250° C.; for example, from 115 to 200° C., and at pressures in the range of from 300 to 1,000 psi; for example, from 400 to 750 psi. In some embodiments, in a dual reactor, the temperature in the first reactor is in the range of from 115 to 190° C., for example, from 115 to 175° C., and the second reactor temperature is in the range of 150 to 250° C., for example, from 130 to 165° C. In other embodiments, in a single reactor, the temperature in the reactor is in the range of from 115 to 250° C., for example, from 115 to 225° C.

The residence time in solution phase polymerization process may be in the range of from 2 to 30 minutes; for example, from 10 to 20 minutes. Ethylene, solvent, hydrogen, one or more catalyst systems, optionally one or more cocatalysts, and optionally one or more comonomers are fed continuously to one or more reactors. Exemplary solvents include, but are not limited to, isoparaffins. For example, such solvents are commercially available under the name ISOPAR E from ExxonMobil Chemical Co., Houston, Texas. The resultant mixture of the polyethylene composition and solvent is then removed from the reactor and the polyethylene composition is isolated. Solvent is typically recovered via a solvent recovery unit, i.e. heat exchangers and vapor liquid separator drum, and is then recycled back into the polymerization system.

In one embodiment, the polyethylene composition may be produced via solution polymerization in a dual reactor system, for example a dual loop reactor system, wherein ethylene is polymerized in the presence of one or more catalyst systems. In some embodiments, only ethylene is polymerized. Additionally, one or more cocatalysts may be present. In another embodiment, the polyethylene composition may be produced via solution polymerization in a single reactor system, for example a single loop reactor system, wherein ethylene is polymerized in the presence of two catalyst systems. In some embodiments, only ethylene is polymerized.

Catalyst Systems

Specific embodiments of catalyst systems that can be used to produce the polyethylene compositions described herein will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

The term "independently selected" is used herein to indicate that the R groups, such as, $R^1$, $R^2$, $R^3$, $R^4$, and $R^5$ can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "($C_x$-$C_y$)" means that the unsubstituted form of the chemical group has from x carbon atoms to y carbon atoms, inclusive of x and y. For example, a ($C_1$-$C_{40}$)alkyl is an alkyl group having from 1 to 40 carbon atoms in its unsubstituted form. In some embodiments and general structures, certain chemical groups may be substituted by one or more substituents such as $R^S$. An $R^S$ substituted version of a chemical group defined using the "($C_x$-$C_y$)" parenthetical may contain more than y carbon atoms depending on the identity of any groups $R^S$. For example, a "($C_1$-$C_{40}$)alkyl substituted with exactly one group $R^S$, where $R^S$ is phenyl (—$C_6H_5$)" may contain from 7 to 46 carbon atoms. Thus, in general when a chemical group defined using the "($C_x$-$C_y$)" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or function group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent.

The term "—H" means a hydrogen or hydrogen radical that is covalently bonded to another atom. "Hydrogen" and "—H" are interchangeable, and unless clearly specified mean the same thing.

The term "($C_1$-$C_{40}$)hydrocarbyl" means a hydrocarbon radical of from 1 to 40 carbon atoms and the term "($C_1$-$C_{40}$)hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic and is unsubstituted or substituted by one or more $R^S$.

In this disclosure, a ($C_1$-$C_{40}$)hydrocarbyl can be an unsubstituted or substituted ($C_1$-$C_{40}$)alkyl, ($C_3$-$C_{40}$)cycloalkyl, ($C_3$-$C_{20}$)cycloalkyl-($C_1$-$C_{20}$)alkylene, ($C_6$-$C_{40}$)aryl, or ($C_6$-$C_{20}$)aryl-($C_1$-$C_{20}$)alkylene. In some embodiments, each of the aforementioned ($C_1$-$C_{40}$)hydrocarbyl groups has a maximum of 20 carbon atoms (i.e., ($C_1$-$C_{20}$)hydrocarbyl) and other embodiments, a maximum of 12 carbon atoms.

The terms "($C_1$-$C_{40}$)alkyl" and "($C_1$-$C_{18}$)alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted ($C_1$-$C_{40}$)alkyl are unsubstituted ($C_1$-$C_{20}$)alkyl; unsubstituted ($C_1$-$C_{10}$)alkyl; unsubstituted ($C_1$-$C_5$)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted ($C_1$-$C_{40}$)alkyl are substituted ($C_1$-$C_{20}$)alkyl, substituted ($C_1$-$C_{10}$)alkyl, trifluoromethyl, and [$C_{45}$]alkyl. The term "[$C_{45}$]alkyl" (with square brackets) means there is a maximum of 45 carbon atoms in the radical, including substituents, and is, for example, a ($C_2$-$C_{40}$)alkyl substituted by one $R^S$, which is a ($C_1$-$C_5$alkyl, respectively. Each ($C_1$-$C_5$)alkyl may be methyl, trifluoromethyl, ethyl, 1-propyl, 1-methylethyl, or 1,1-dimethylethyl.

The term "($C_6$-$C_{40}$)aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2, or 3 rings, respectively; wherein the 1 ring is aromatic and the 2 or 3 rings independently are fused or non-fused and at least one of the 2 or 3 rings is aromatic. Examples of unsubstituted ($C_6$-$C_{40}$)aryl are unsubstituted ($C_6$-$C_{20}$)aryl unsubstituted ($C_6$-$C_{18}$)aryl; 2-($C_1$-$C_5$)alkyl-phenyl; 2,4-bis($C_1$-$C_5$)alkyl-phenyl; phenyl; fluorenyl; tetrahydrofluorenyl; indacenyl; hexahydroindacenyl; indenyl; dihydroindenyl; naphthyl; tetrahydronaphthyi; and phenanthrene. Examples of substituted ($C_6$-$C_{40}$)aryl are substituted ($C_1$-$C_{20}$)aryl; substituted ($C_6$-$C_{18}$)aryl; 2,4-bis [($C_{20}$)alkyl]-phenyl; polyfluorophenyl; pentafluorophenyl; and fluoren-9-one-1-yl.

The term "($C_3$-$C_{40}$)cycloalkyl" means a saturated cyclic hydrocarbon radical of from 3 to 40 carbon atoms that is unsubstituted or substituted by one or more $R^S$. Other cycloalkyl groups (e.g., ($C_x$-$C_y$)cycloalkyl) are defined in an analogous manner as having from x to y carbon atoms and being either unsubstituted or substituted with one or more $R^S$. Examples of unsubstituted $C_3$-$C_{40}$)cycloalkyl are unsubstituted ($C_3$-$C_{20}$)cycloalkyl, unsubstituted ($C_3$-$C_{10}$)cycloalkyl, cyclopropyl, cyclobutyl, cyclopentyl, cyclohexyl, cycloheptyl, cyclooctyl, cyclononyl, and cyclodecyl. Examples of substituted ($C_3$-$C_{40}$)cycloalkyl are substituted ($C_3$-$C_{20}$)cycloalkyl, substituted ($C_3$-$C_{10}$)cycloalkyl, cyclopentanon-2-yl, and 1-fluorocyclohexyl.

Examples of ($C_1$-$C_{40}$)hydrocarbylene include unsubstituted or substituted ($C_6$-$C_{40}$)arylene, ($C_3$-$C_{40}$)cycloalkylene, and ($C_1$-$C_{40}$)alkylene (e.g., ($C_1$-$C_{20}$)alkylene). In some embodiments, the diradicals are on the same carbon atom (e.g., —$CH_2$—) or on adjacent carbon atoms (i.e., 1,2-diradicals), or are spaced apart by one, two, or more than two intervening carbon atoms (e.g., respective 1,3-diradicals, 1,4-diradicals, etc.). Some diradicals include α,ω-diradical. The α,ω-diradical is a diradical that has maximum carbon backbone spacing between the radical carbons. Some examples of ($C_2$-$C_{20}$)alkylene α,ω-diradicals include ethan-1,2-diyl (i.e. —$CH_2CH_2$—), propan-1,3-diyl (i.e. —$CH_2CH_2CH_2$—), 2-methylpropan-1,3-diyl (i.e. —$CH_2CH(CH_3)CH_2$—). Some examples of ($C_6$-$C_{50}$) arylene α,ω-diradicals include phenyl-1,4-diyl, napthalen-2,6-diyl, or napthalen-3,7-diyl.

The term "($C_1$-$C_{40}$)alkylene" means a saturated straight chain or branched chain diradical (i.e., the radicals are not on ring atoms) of from 1 to 40 carbon atoms that is unsubstituted or substituted by one or more $R^S$. Examples of unsubstituted ($C_1$-$C_{50}$)alkylene are unsubstituted ($C_1$-$C_{20}$)alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—. —$CH_2C^*HCH_3$, and —$(CH_2)_4C^*(H)(CH_3)$, in which "C*" denotes a carbon atom from which a hydrogen atom is removed to form a secondary or tertiary alkyl radical. Examples of substituted ($C_1$-$C_{50}$)alkylene are substituted ($C_1$-$C_{20}$)alkylene, —$CF_2$—, —C(O)—, and —(($CH_2$)$_{14}$C($CH_3$)$_2$($CH_2$)$_5$— (i.e., a 6,6-dimethyl substituted normal-1,20-eicosylene). Since as mentioned previously two $R^S$ may be taken together to form a ($C_1$-$C_{18}$) alkylene, examples of substituted ($C_1$-$C_{50}$)alkylene also include 1,2-bis(methylene)cyclopentane, 1,2-his(methylene)cyclohexane, 2,3-bis(methylene)-7,7-dimethyl-bicyclo[2.2.1]heptane, and 2,3-bis (methylene)bicyclo [2.2.2] octane.

The term "$(C_3-C_{40})$cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. Examples of heteroatoms include O, S, S(O), S(O)$_2$, Si($R^C$)$_2$, P($R^P$), N($R^N$), —N=C($R^C$)$_2$, —Ge($R^C$)—, or —Si($R^C$)—, where each $R^C$, each $R^N$, and each $R^P$ is unsubstituted $(C_1-C_{18})$hydrocarbyl or —H. The term "heterohydrocarbon" refers to a molecule or molecular framework in which one or more carbon atoms are replaced with a heteroatom. The term "$(C_1-C_{40})$heterohydrocarbyl" means a heterohydrocarbon radical of from 1 to 40 carbon atoms and the term "$(C_1-C_{40})$heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atom, (2) one or two heteroatoms, or (3) a carbon atom and a heteroatom. Each $(C_1-C_{50})$heterohydrocarbyl and $(C_1-C_{50})$heterohydrocarbylene may be unsubstituted or substituted (by one or more $R^S$) aromatic or non-aromatic, saturated or unsaturated, straight chain or branched chain, cyclic (including mono- and poly-cyclic, fused and non-fused polycyclic), or acyclic.

The $(C_1-C_{40})$heterohydrocarbyl may be unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si($R^C_2$—, $(C_1-C_{40})$hydrocarbyl-N($R^N$)—, $(C_1-C_{40})$hydrocarbyl-P($R^P$)—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{40})$heteroaryl" means an unsubstituted or substituted (by one or more $R^S$) mono-, bi- or tricyclic heteroaromatic hydrocarbon radical of from 4 to 40 total carbon atoms and from 1 to 10 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered or 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The aforementioned heteroalkyl nay be saturated straight or branched chain radicals containing $(C_1-C_{50})$ carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatoms, as defined above, may include Si($R^C$)$_3$, Ge($R^C$)$_3$, Si($R^C$)$_2$, Ge($R^C$)$_2$, P($R^P$)$_2$, P($R^P$), N($R^N$)$_2$, N($R^N$), N, O, O$R^C$, S, S$R^C$, S(O), and S(O)$_2$, wherein each of the heteroalkyl and heteroalkylene groups are unsubstituted or substituted by one or more $R^S$.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-azacyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride (F$^-$), chloride (Cl$^-$), bromide (Br$^-$), or iodide (I$^-$). The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero) aromatic rings, if any.

According to some embodiments, a catalyst system for producing a polyethylene composition includes a metal-ligand complex according to formula (I):

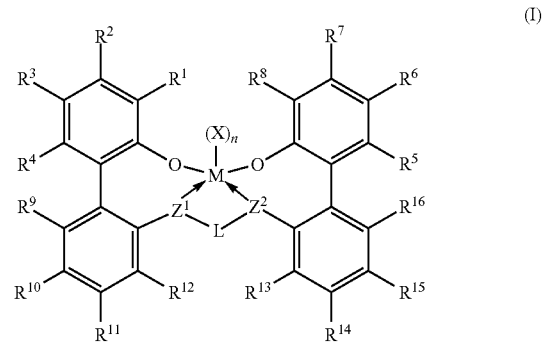

(I)

In formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; each Z is independently chosen from —O—, —S—, —N($R^N$)—, or —P($R^P$)—; L is ($C_1$-$C_{40}$)hydrocarbylene or ($C_1$-$C_{40}$)hetero-hydrocarbylene, wherein the ($C_1$-$C_{40}$)hydrocarbylene has a portion that comprises a 1-carbon atom to 10-carbon atom linker backbone linking the two Z groups in Formula (I) (to which L is bonded) or the ($C_1$-$C_{40}$)heterohydrocarbylene has a portion that comprises a 1-atom to 10-atom linker backbone linking the two Z groups in Formula (I), wherein each of the 1 to 10 atoms of the 1-atom to 10-atom linker backbone of the ($C_1$-$C_{40}$)heterohydrocarbylene independently is a carbon atom or heteroatom, wherein each heteroatom independently is O, S, S(O), S(O)$_2$, Si($R^C$)$_2$, Ge($R^C$)$_2$, P($R^C$), or N($R^C$), wherein independently each $R^C$ is ($C_1$-$C_{30}$)hydrocarbyl or ($C_1$-$C_{30}$)heterohydrocarbyl; $R^1$ and $R^8$ are independently selected from the group consisting of —H, ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, and radicals having formula (II), formula (III), or formula (IV):

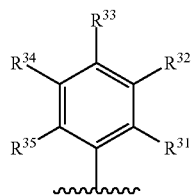

(II)

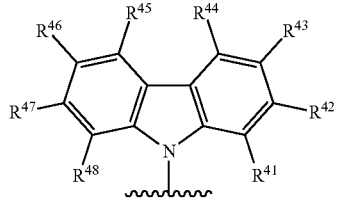

(III)

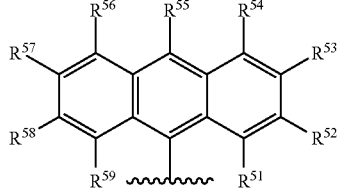

(IV)

In formulas (II), (III), and (IV), each of $R^{31-35}$, $R^{41-48}$, or $R^{51-59}$ is independently chosen from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CHR$^C$, —OR$^C$, —SR$^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, or —H, provided at least one of $R^1$ or $R^8$ is a radical having formula (II), formula (III), or formula (IV).

In formula (I), each of $R^{2-4}$, $R^{5-7}$, and $R^{9-16}$ is independently selected from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CHR$^C$, —OR$^C$, —SR$^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, and —H.

In some embodiments, the polyethylene composition is formed using a first catalyst according to formula (1) in a first reactor and a different catalyst according to formula (I) in a second reactor.

In one exemplary embodiment where a dual loop reactor is used, the procatalyst used in the first loop is zirconium, [[2,2'''-[[bis[1-methylethyl)germylene]bis(methyleneoxy-κO)]bis[3'',5,5''-tris(1,1-dimethylethyl)-5'-octyl[1,1':3',1''-terphenyl]-2'-olato-κO]](2-)]dimethyl-, having the chemical formula $C_{86}H_{128}F_2GeO_4Zr$ and the following structure:

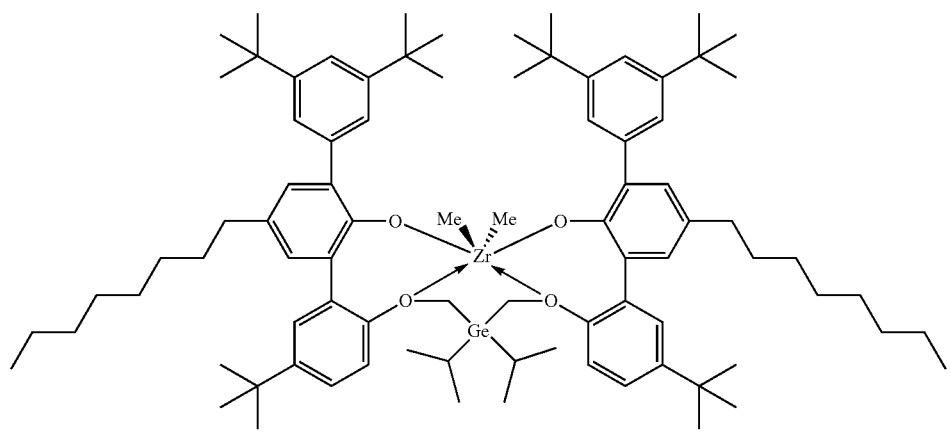

In such an embodiment, the procatalyst used in the second loop is zirconium, [[2,2'''-[1,3-propanediylbis(oxy-κO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1']-biphenyl]-2-olato-κO]](2-)]dimethyl, having the chemical formula $C_{107}H_{154}N_2O_4Si_2Zr$ and the following structure:

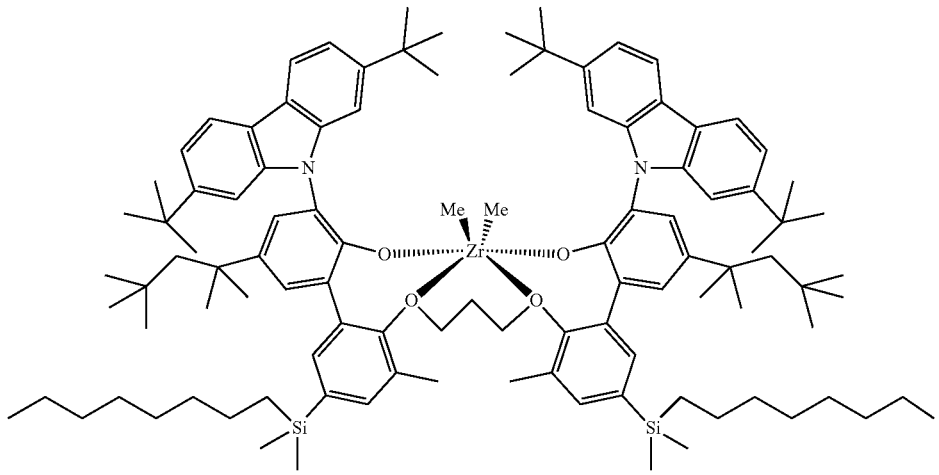

Co-Catalyst Component

The catalyst system comprising a metal-ligand complex of formula (I) may be rendered catalytically active by any technique known in the art for activating metal-based catalysts of olefin polymerization reactions. For example, the system comprising a metal-ligand complex of formula (I) may be rendered catalytically active by contacting the complex to, or combining the complex with, an activating co-catalyst. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (co-catalysts) include Group 13 metal compounds containing from 1 to 3 $(C_1-C_{20})$hydrocarbyl substituents as described herein. In one embodiment, Group 13 metal compounds are tri$((C_1-C_{20})$hydrocarbyl)-substituted-aluminum or tri$((C_1-C_{20})$hydrocarbyl)-boron compounds. In other embodiments, Group 13 metal compounds are tri(hydrocarbyl)-substituted-aluminum, tri$((C_1-C_{20})$hydrocarbyl)-boron compounds, tri$((C_1-C_{10})$alkyl)aluminum, tri$((C_6-C_{18})$aryl)boron compounds, and halogenated (including perhalogenated) derivatives thereof. T n further embodiments, Group 13 metal compounds are tris(fluoro-substituted phenyl)boranes, tris(pentafluorophenyl)borane. In some embodiments, the activating co-catalyst is a tris $((C_1-C_{20})$hydrocarbyl borate (e.g. trityl tetrafluoroborate) or a tri$((C_1-C_{20})$hydrocarbyl)ammonium tetra$((C_1-C_{20})$hydrocarbyl)borane (e.g. bis(octadecyl)methylammonium tetrakis (pentafluorophenyl)borane). As used herein, the term "ammonium" means a nitrogen cation that is a $((C_1-C_{20})$hydrocarbyl)$_4$N$^+$ a $((C_1-C_{20})$hydrocarbyl)$_3$N(H)$^+$, a $((C_1-C_{20})$hydrocarbyl)$_2$N(H)$_2^+$ $(C_1-C_{20})$hydrocarbylN(H)$_3^+$, or N(H)$_4^+$, wherein each $(C_1-C_{20})$hydrocarbyl, when two or more are present, may be the same or different.

Combinations of neutral Lewis acid activators (co-catalysts) include mixtures comprising a combination of a tri$((C_1-C_4)$alkyl)aluminum and a halogenated tri$((C_1-C_{20})$aryl)boron compound, especially a tris(pentafluorophenyl)borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane):(alumoxane) [e.g., (Group 4 metal-ligand complex):(tris (pentafluoro-phenylborane):(alunmoxane)] are from 1:1:1 to 1:10:30, in other embodiments, from 1:1:1.5 to 1:5:10.

The catalyst system comprising the metal-ligand complex of formula (1) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl, tetrakis(pentafluorophenyl)borate(1$^-$) amine, and combinations thereof.

In some embodiments, one or more of the foregoing activating co-catalysts are used in combination with each other. An especially preferred combination is a mixture of a tri$((C_1-C_4)$hydrocarbyl)aluminum, tri$((C_1-C_4)$hydrocarbyl) borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (1). When tris(pentafluorophenyl)borane alone is used as the activating co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Nucleating Agent

The polyethylene-based compositions used in the oriented, multilayer films of the present invention further comprise a nucleating agent that is a calcium salt of 1,2-cyclohexanedicarboxylic acid or sodium 4-[(4-chlorobenzoyl) amino] benzoate. These nucleating agents, when used in the appropriate amount and in combination with the polyethylene compositions described herein, are believed to provide a more homogenous distribution of crystals and crystal size in a polyethylene film, a more uniform melting behavior of the resulting polyethylene-based composition and film formed from the polyethylene-based composition, and a larger operating window during orientation of films formed from the polyethylene-based compositions while also providing one or more other improvements in the resulting films (e.g., stiffness, barrier, and/or optics).

In some embodiments, the nucleating agent is calcium salt of 1,2-cyclohexanedicarboxylic acid. In some embodiments, the nucleating agent is sodium 4-[(4-chlorobenzoyl) amino] benzoate. In some embodiments, the polyethylene-based compositions comprises both calcium salt of 1,2-cyclohexanedicarboxylic acid and sodium 4-[(4-chlorobenzoyl) amino] benzoate.

Nucleating agents, such as calcium salt of 1,2-cyclohexanedicarboxylic acid or sodium 4-[(4-chlorobenzoyl) amino] benzoate, are heterogeneous nucleating agents. The amount and type of heterogeneous nucleating agent is important in providing the desired performance. In some embodiments, the polyethylene-based composition comprises 20 to 5000 ppm heterogeneous nucleating agents in the form of calcium salt of 1,2-cyclohexanedicarboxylic acid or sodium 4-[(4-chlorobenzoyl) amino] benzoate, based on the total weight of the polyethylene-based composition. In some embodiments, the polyethylene-based composition comprises 20 to 2000 ppm of calcium salt of 1,2-cyclohexanedicarboxylic acid or sodium 4-[(4-chlorobenzoyl) amino] benzoate, based on the total weight of the polyethylene-based composition. In some embodiments, the polyethylene-based composition comprises 500 to 2000 ppm of calcium salt of 1,2-cyclohexanedicarboxylic acid or sodium 4-[(4-chlorobenzoyl) amino] benzoate, based on the total weight of the polyethylene-based composition.

In some embodiments, the heterogeneous nucleating agent may be provided with a fatty acid metal salt such as zinc stearate, zinc palmitate, and mixtures thereof. Based on how zinc stearate is prepared commercially, some zinc palmitate may also be present as commercial stearic acid often contains a substantial amount of palmitic acid. In some such embodiments, the polyethylene-based composition comprises 45 to 1000 ppm of at least one of zinc stearate and zinc palmitate, based on the total weight of the polyethylene-based composition. In some embodiments, the polyethylene-based composition comprises 50 to 700 ppm of zinc stearate and/or zinc palmitate, based on the total weight of the polyethylene-based composition. In some embodiments, the polyethylene-based composition comprises 85 to 600 ppm of zinc stearate and/or zinc palmitate, based on the total weight of the polyethylene-based composition.

One non-limiting example of a calcium salt of 1,2-cyclohexanedicarboxylic acid that can be used in embodiments of the present invention is Hyperform HPN-20E from Milliken Chemical, Spartanburg, South Carolina. Hyperform HPN-20E comprises 60-70 weight percent of calcium salt of 1,2-cyclohexanedicarboxylic acid and 30-40 weight percent of zinc stearate/zinc palmitate. In some embodiments, the polyethylene-based composition comprises 20 to 5000 ppm of Hyperform HPN-20E based on the total weight of the polyethylene-based composition. The polyethylene-based composition, in some embodiments, comprises 20 to 2000 ppm of Hyperform HPN-20E based on the total weight of the polyethylene-based composition.

One non-limiting example of sodium 4-[(4-chlorobenzoyl) amino] benzoate that can be used in embodiments of the present invention is Hyperform HPN 210M from Milliken Chemical, Spartanburg, South Carolina.

In some embodiments, the calcium salt of 1,2-cyclohexanedicarboxylic acid or sodium 4-[(4-chlorobenzoyl) amino] benzoate (and the fatty acid metal salt (e.g., zinc stearate and/or zinc palmitate) when also included) can be provided as a masterbatch by blending it with a carrier resin before combining with the polyethylene compositions described herein. In some such embodiments, the carrier resin is a polyethylene having a melt index ($I_2$) of 1 to 12 g/10 minutes. In some embodiments where the calcium salt of 1,2-cyclohexanedicarboxylic acid and zinc stearate/zinc palmitate are provided as a masterbatch, the masterbatch comprises 2 to 4 weight percent of the calcium salt of 1,2-cyclohexanedicarboxylic acid and zinc stearate/zinc palmitate, based on the total weight of the masterbatch. In one embodiment, the carrier resin is a narrow molecular weight distribution high density polyethylene homopolymer having a density of 0.965 and a melt index ($I_2$) of 8 to 9 g/10 minutes. In some embodiments, the masterbatch can include other additives as well. Depending on the total amount of additives included, the masterbatch can comprise 85 to 98 weight percent of the carrier resin, based on the total weight of the masterbatch.

Other nucleating agents that can be used in some embodiments of the present invention include those disclosed in US Patent Publication Nos. 2015/0087758, 2015/0087759 and 2015/0086736, which are hereby incorporated by reference. In some embodiments, the polyethylene-based composition comprises 20 to 5000 ppm of such a nucleating agent based on the total weight of the polyethylene-based composition. The polyethylene-based composition, in some embodiments, comprises 20 to 2000 ppm of such a nucleating agent based on the total weight of the polyethylene-based composition.

Silica

In some embodiments, the polyethylene composition further comprises silica. Silica, when used in the appropriate amount and in combination with the polyethylene compositions described herein, has been found to provide a reduced level of dusting in films formed from the polyethylene-based compositions.

The amount of silica used in the polyethylene-based composition can be important in reducing the level of dusting when the polyethylene-based composition is incorporated into a surface layer of a film. In some embodiments, the polyethylene-based composition comprises 75 to 800 ppm silica, based on the total weight of the polyethylene-based composition. In some embodiments, the polyethylene-based composition comprises 100 to 500 ppm of silica, based on the total weight of the polyethylene-based composition.

One non-limiting example of a silica that can be used in embodiments of the present invention is Sylobloc 45 commercially available from Grace Davison Company.

In some embodiments, talc can be used in addition to, or as an alternative to, silica.

In some embodiments, the silica can be provided as a masterbatch by blending it with a carrier resin, the calcium salt of 1,2-cyclohexanedicarboxylic acid or similar nucleating agent, and zinc stearate/zinc palmitate before combining with the polyethylene compositions described herein. The masterbatch can be as described above in connection with the calcium salt of 1,2-cyclohexanedicarboxylic acid and zinc stearate/zinc palmitate. The amount of silica in the masterbatch can be based on the target silica for the overall polyethylene-based composition.

Oriented Multilayer Films

The oriented (uniaxially or biaxially) polyethylene films of the present invention are multilayer films. As previously indicated, such films include at least one layer comprising the polyethylene-based composition described herein.

In some embodiments of multilayer films of the present invention, a multilayer film can include a polyethylene-based composition as described in more than one layer while in other embodiments, such polyethylene-based composition is provided in a single layer. The amount of the polyethylene-based composition to use in films of the present invention can depend on a number of factors including, for example, the other layers in the film, the desired properties of the film, the end use application of the film, and others.

The number of layers in the film can depend on a number of factors including, for example, the desired properties of the film, the desired thickness of the film, the content of the other layers of the film, the end use application of the film, the equipment available to manufacture the film, and others. For example, a multilayer film can further comprise other layers typically included in multilayer films depending on the application including, for example, sealant layers, barrier layers, tie layers, structural layers, etc. A multilayer blown film can comprise up to 2, 3, 4, 5, 6, 7, 8, 9, 10, or 11 layers in various embodiments.

Other layers within a multilayer film of the present invention can comprise, in various embodiments, a polymer selected from the following: the polyethylene-based composition described herein, a LLDPE, a MDPE, a LDPE, a HDPE, a HMWHDPE (a high molecular weight HDPE), a propylene-based polymer, a polyolefin plastomer (POP), a polyolefin elastomer (POE), an olefin block copolymer (OBC), an ethylene vinyl acetate, an ethylene acrylic acid, an ethylene methacrylic acid, an ethylene methyl acrylate, an ethylene ethyl acrylate, an ethylene butyl acrylate, an isobutylene, a maleic anhydride-grafted polyolefin, an ionomer of any of the foregoing, or a combination thereof.

In some embodiments, in addition to the polyethylene-based composition, the oriented, multilayer polyethylene film further comprises a second polyethylene composition, with the second polyethylene composition exhibiting at least two local peaks, excluding the soluble fraction, in comonomer distribution measured by crystallization elution fractionation, wherein one of the peaks is between 40° C. and 95° C. In some embodiments, the fraction that forms the peak between 40° C. and 95° C. is up 50 weight percent of the composition as measured by crystallization elution fractionation. In some embodiments, the second polyethylene composition exhibits at least two local peaks, excluding the soluble fraction, in comonomer distribution measured by crystallization elution fractionation, wherein one of the peaks is between 40° C. and 87° C. In some embodiments, the fraction that forms the peak between 40° C. and 87° C. is up 50 weight percent of the composition as measured by crystallization elution fractionation. In some embodiments, the density of the second polyethylene composition is from 0.928 to 0.940 g/cm$^3$. Examples of polyethylene compositions that can be used as the second polyethylene composition include the linear low density polyethylene resin that is described in U.S. Pat. No. 10,363,700, which is hereby incorporated by reference, as well as the following commercially available resins: DOWLEX™ 2750ST, ELITE™ 5940G and ELITE™ 5960G from The Dow Chemical Company. In embodiments where the film includes such a second composition, the amount of the second composition to use and the location (i.e., layer(s)) can depend on a number of factors including, for example, the other layers in the film, the desired properties of the film, the end use application of the film, and others. In some embodiments, the second compositions is provided in a layer of the film with the polyethylene-based composition described herein.

It should be understood that, in some embodiments, any of the layers within the film can further comprise one or more additives (in addition to those described above for the polyethylene-based composition) as known to those of skill in the art such as, for example, antioxidants, ultraviolet light stabilizers, thermal stabilizers, slip agents, antiblock, pigments or colorants, processing aids, crosslinking catalysts, flame retardants, fillers and foaming agents.

By being polyethylene-based, the inventive oriented, multilayer polyethylene films, according to some embodiments of the present invention, can be incorporated into multilayer films and articles that are comprised primarily, if not substantially or entirely, of polyethylene in order to provide a film and articles that is more easily recyclable. For example, a film that comprises primarily polyethylene has an improved recyclability profile in addition to other advantages that the usage of such polymers may provide. For example, in some embodiments, other than additives, the multilayer film is comprised entirely of ethylene-based polymers. Based on the total weight of the multilayer film, the multilayer film may include 90% by weight ethylene-based polymer in some embodiments, or 95% by weight ethylene-based polymer in some embodiments, or 99% by weight ethylene-based polymer in some embodiments, or 99.9% by weight ethylene-based polymer in some embodiments, or 100% by weight ethylene-based polymer in some embodiments.

The multilayer films, prior to orientation, can have a variety of thicknesses depending, for example, on the number of layers, the intended use of the film, and other factors. Such polyethylene films, in some embodiments, have a thickness prior to orientation of 320 to 3200 microns (typically, 640-1920 microns).

Prior to orientation, the polyethylene films can be formed using techniques known to those of skill in the art based on the teachings herein. For example, the films can be prepared as blown films (e.g., water quenched blown films) or cast films. For example, in the case of multilayer polyethylene films, for those layers that can be coextruded, such layers can be coextruded as blown films or cast films using techniques known to those of skill in the art based on the teachings herein.

In various embodiments, the polyethylene film can be uniaxially oriented or biaxially oriented using techniques known to those having ordinary skill in the art.

In some embodiments where the film is biaxially oriented, the polyethylene film is biaxially oriented using a tenter frame sequential biaxial orientation process. Such techniques are generally known to those of skill in the art. In other embodiments, the polyethylene film can be biaxially oriented using other techniques known to those of skill in the art based on the teachings herein, such as double bubble orientation processes. In general, with a tenter frame sequential biaxial orientation process, the tenter frame is incorporated as part of a multilayer co-extrusion line. After extruding from a flat die, the film is cooled down on a chill roll, and is immersed into a water bath filled with room temperature water. The cast film is then passed onto a series of rollers with different revolving speeds to achieve stretching in the machine direction. There are several pairs of rollers in the MD stretching segment of the fabrication line, and are all oil heated. The paired rollers work sequentially as pre-heated rollers, stretching rollers, and rollers for relaxing and annealing. The temperature of each pair of rollers is separately controlled. After stretching in the machine direction, the film web is passed into a tenter frame hot air oven with heating zones to carry out stretching in the cross direction. The first several zones are for pre-heating, followed by zones for stretching, and then the last zones for annealing.

In some embodiments, the polyethylene film can be oriented in the machine direction at a draw ratio of 2:1 to 9:1, or in the alternative, at a draw ratio of 2:1 to 6:1, or in the alternative, at a draw ratio of 4:1 to 6:1. The polyethylene film, in some embodiments, can be oriented in the cross direction at a draw ratio of 2:1 to 11:1, or in the alternative, at a draw ratio of 2:1 to 9:1, or in the alternative, at a draw ratio of 6:1 to 9:1. In some embodiments, the polyethylene film is oriented in the machine direction at a draw ratio of 2:1 to 9:1 and in the cross direction at a draw ratio of 2:1 to 11:1. The polyethylene film, in some embodiments, is oriented in the machine direction at a draw ratio of 2:1 to 6:1 and in the cross direction at a draw ratio of 2:1 to 9:1. In some embodiments, the polyethylene film is oriented in the machine direction at a draw ratio of 4:1 to 6:1 and in the cross direction at a draw ratio of 6:1 to 9:1.

After orientation, the biaxially oriented film has a thickness of 5 to 50 microns in some embodiments. In some embodiments, the biaxially oriented film has a thickness of 15 to 40 microns.

In some embodiments when the multilayer film is uniaxially oriented, the film is oriented in the machine direction only. Various processing parameters are considered suitable for stretching in the machine direction as known to those having ordinary skill in the art based on the teachings herein. For example, the uniaxially oriented, multilayer film may be oriented in the machine direction at a draw ratio greater than 1:1 and less than 8:1, or at a draw ratio from 4:1 to 8:1.

After orientation, the machine direction oriented film has a thickness of 5 to 50 microns in some embodiments. In some embodiments, the machine direction oriented film has a thickness of 15 to 40 microns.

In some embodiments, depending for example on the end use application, the oriented polyethylene film can be corona treated, plasma treated, or printed using techniques known to those of skill in the art. In some embodiments, the oriented multilayer film can be surface coated with aluminum, silicon oxide, aluminum oxide, or other metals known to those having ordinary skill in the art based on the teachings herein.

Laminates

Embodiments of the present invention also comprise laminates incorporating oriented, multilayer polyethylene films. In some embodiments, a biaxially oriented, multilayer polyethylene film according to embodiments of the present invention can be laminated to another film. In some embodiments, a uniaxially oriented (e.g., machine direction oriented), multilayer polyethylene film according to embodiments of the present invention can be laminated to another film.

The other film in such embodiments comprises a polyethylene sealant film, polyethylene terephthalate, polypropylene, or a polyamide. A polyethylene sealant film can be a monolayer or multilayer film formed substantially from polyethylene (e.g., comprises greater than 90 weight percent ethylene-based polymers, or greater than 95 weight percent ethylene-based polymers, or greater than 99 weight percent ethylene-based properties) that when heated as part of the laminate structure can seal the laminate to another film, to another laminate, or to itself. Any polyethylene sealant film known to those of ordinary skill in the art based on the teachings herein may be used. When the other film comprises polyethylene terephthalate, polypropylene, or polyamide, the entire film may be formed from polyethylene terephthalate, polypropylene, or polyamide, or the film comprises at least one layer that includes polyethylene terephthalate, polypropylene, or polyamide. Persons having ordinary skill in the art can select films that comprise polyethylene terephthalate, polypropylene, or polyamide for use in such embodiments based on the teachings herein.

Laminates according to embodiments of the present invention can be formed using techniques known to those having ordinary skill in the art based on the teachings herein. For example, the oriented, multilayer polyethylene film can be laminated to the other film using an adhesive. Various adhesive compositions are considered suitable for the adhesives used to make a laminate. These may include polyurethane, epoxy, acrylic, or the like. In one embodiment, the laminate may comprise adhesive layers comprising polyurethane adhesive. The polyurethane adhesive may be solventless, waterborne or solvent based. Furthermore, the polyurethane adhesive may be a two part formulation. The weight or thickness of the adhesive layer can depend on a number of factors including, for example, the desired thickness of the multilayer structure, the type of adhesive used, and other factors. In some embodiments, the adhesive layer is applied at up to 5.0 grams/m$^2$, or from 1.0 to 4.0 g/m$^2$, or from 2.0 to 3.0 g/m$^2$.

Laminates according to some embodiments of the present invention can also be formed by extrusion lamination.

Articles

Embodiments of the present invention also relate to articles, such as packages, formed from or incorporating oriented, multilayer polyethylene films of the present invention (or from laminates incorporating such films). Such packages can be formed from any of the films or laminates described herein.

Examples of such articles can include flexible packages, pouches, stand-up pouches, and pre-made packages or pouches. In some embodiments, oriented, multilayer polyethylene films or laminates of the present invention can be used for food packages. Examples of food that can be included in such packages include meats, cheeses, cereal, nuts, juices, sauces, and others. Such packages can be formed using techniques known to those of skill in the art based on the teachings herein and based on the particular use for the package (e.g., type of food, amount of food, etc.).

Test Methods

Unless otherwise indicated herein, the following analytical methods are used in describing aspects of the present invention:

Melt Index

Melt indices $I_2$ (or I2) and $I_{10}$ (or I10) were measured in accordance to ASTM D-1238 (method B) at 190° C. and at 2.16 kg and 10 kg load, respectively. Their values are reported in g/10 min.

Density

Samples for density measurement were prepared according to ASTM D4703. Measurements were made, according to ASTM D792, Method B, within one hour of sample pressing.

Conventional Gel Permeation Chromatography (Conv. GPC)

A GPC-IR high temperature chromatographic system from PolymerChar (Valencia, Spain), is equipped with a Precision Detectors (Amherst, MA), 2-angle laser light scattering detector Model 2040, an IR5 infra-red detector and a 4-capillary viscometer, both from PolymerChar. Data collection is performed using PolymerChar Instrument Control software and data collection interface. The system is equipped with an on-line, solvent degas device and pumping system from Agilent Technologies (Santa Clara, CA).

Injection temperature is controlled at 150 degrees Celsius. The columns used are three, 10-micron "Mixed-B" columns from Polymer Laboratories (Shropshire, UK). The solvent used is 1,2,4-trichlorobenzene. The samples are prepared at a concentration of "0.1 grams of polymer in 50 milliliters of solvent." The chromatographic solvent and the sample preparation solvent each contained "200 ppm of butylated hydroxytoluene (BHT)." Both solvent sources are nitrogen sparged. Ethylene-based polymer samples are stirred gently at 160 degrees Celsius for three hours. The injection volume is "200 microliters,' and the flow rate is "1 milliliters/ minute." The GPC column set is calibrated by running 21 "narrow molecular weight distribution" polystyrene standards. The molecular weight (MW) of the standards ranges from 580 to 8,400,000 g/mole, and the standards are contained in six "cocktail" mixtures. Each standard mixture has at least a decade of separation between individual molecular weights. The standard mixtures are purchased from Polymer Laboratories. The polystyrene standards are prepared at "0.025 g in 50 mL of solvent" for molecular weights equal to, or greater than, 1,000,000 g/mole, and at "0.050 g in 50 mL of solvent" for molecular weights less than 1,000,000 g/mole.

The polystyrene standards are dissolved at 80° C., with gentle agitation, for 30 minutes. The narrow standards mixtures are run first, and in order of decreasing "highest molecular weight component," to minimize degradation. The polystyrene standard peak molecular weights are converted to polyethylene molecular weight using Equation 1 (as described in Williams and Ward, *J. Polym. Sci.*, Polym. Letters, 6, 621 (1968)):

$$M\text{polyethylene} = A \times (M\text{polystyrene})^B \quad \text{(Eqn. 1)},$$

where M is the molecular weight, A is equal to 0.4316 and B is equal to 1.0.

Number-average molecular weight (Mn(conv gpc)), weight average molecular weight (Mw-conv gpc), and z-average molecular weight (Mz(conv gpc)) are calculated according to Equations 2-4 below.

$$Mn(conv\ gpc) = \frac{\sum_{i=RV_{integration\ start}}^{i=RV_{integration\ end}} (IR_{measurement\ channel_i})}{\sum_{i=RV_{integration\ start}}^{i=RV_{integration\ end}} = (IR_{measurement\ channel_i}/M_{PE_i})} \quad \text{(Eqn. 2)}$$

$$Mw(conv\ gpc) = \frac{\sum_{i=RV_{integration\ start}}^{i=RV_{integration\ end}} (M_{PE_i}\ IR_{measurement\ channel_i})}{\sum_{i=RV_{integration\ start}}^{i=RV_{integration\ end}} = (IR_{measurement\ channel_i})} \quad \text{(Eqn. 3)}$$

$$Mz(conv\ gpc) = \frac{\sum_{i=RV_{integration\ start}}^{i=RV_{integration\ end}} (M_{PE_i}^2\ IR_{measurement\ channel_i})}{\sum_{i=RV_{integration\ start}}^{i=RV_{integration\ end}} = (M_{PE_i}\ IR_{measurement\ channel_i})} \quad \text{(Eqn. 4)}$$

In Equations 2-4, the RV is column retention volume (linearly-spaced), collected at "1 point per second," the JR is the baseline-subtracted JR detector signal, in Volts, from the IR5 measurement channel of the GPC instrument, and $M_{PE}$ is the polyethylene-equivalent MW determined from Equation 1. Data calculation are performed using "GPC One software (version 2.013H)" from PolymerChar.

Creep Zero Shear Viscosity Measurement Method

Zero-shear viscosities are obtained via creep tests, which are conducted on an AR G2 stress controlled rheometer (TA Instruments; New Castle, Del), using "25-mm-diameter" parallel plates, at 190° C. The rheometer oven is set to test temperature for at least 30 minutes, prior to zeroing the fixtures. At the testing temperature, a compression molded sample disk is inserted between the plates, and allowed to come to equilibrium for five minutes. The upper plate is then lowered down to 50 µm (instrument setting) above the desired testing gap (1.5 mm). Any superfluous material is trimmed off, and the upper plate is lowered to the desired gap. Measurements are done under nitrogen purging, at a flow rate of 5 L/min. The default creep time is set for two hours. Each sample is compression-molded into a "2 mm thick×25 mm diameter" circular plaque, at 177° C., for five minutes, under 10 MPa pressure, in air. The sample is then taken out of the press and placed on a counter top to cool.

A constant low shear stress of 20 Pa is applied for all of the samples, to ensure that the steady state shear rate was low enough to be in the Newtonian region. The resulting steady state shear rates are in the range from $10^{-3}$ to $10^{-4}$ s$^{-1}$ for the samples in this study. Steady state is determined by taking a linear regression for all the data, in the last 10% time window of the plot of "log (J(t)) vs. log(t)," where J(t) is creep compliance and t is creep time. If the slope of the linear regression is greater than 0.97, steady state is considered to be reached, then the creep test is stopped. In all cases in this study, the slope meets the criterion within one hour. The steady state shear rate is determined from the slope of the linear regression of all of the data points, in the last 10% time window of the plot of "ε vs. t," where ε is strain. The creep zero shear viscosity is determined from the ratio of the applied stress to the steady state shear rate.

In order to determine if the sample was degraded during the creep test, a small amplitude oscillatory shear test is conducted before, and after, the creep test, on the same specimen from 0.1 to 100 rad/s. The complex viscosity values of the two tests are compared. If the difference of the viscosity values, at 0.1 rad/s, is greater than 5%, the sample was considered to have degraded during the creep test, and the result is discarded.

Zero-Shear Viscosity Ratio (ZSVR)

The zero-shear viscosity ratio (ZSVR) is defined as the ratio of the zero-shear viscosity (ZSV) of the branched polyethylene material to the ZSV of the linear polyethylene material at the equivalent average molecular wt. according to the equation:

$$ZSVR = \eta_{OB}/\eta_{OL} = \eta_{OB}/(2.29^{-15} \times M\text{wt}^{3.65})$$

The ZSV value is obtained from a creep test at 190° C., via the method described above. The Mwt is determined using conventional gel permeation chromatography, as described above. The correlation between the ZSV of linear polyethylene and its molecular weight was established based on a series of linear polyethylene reference materials. Lower ZSVR indicates lower level of long chain branching.

Branching Measurements Using $^{13}$C NMR

Sample Preparation

The samples are prepared by adding approximately 2.7 g of a 50/50 mixture of tetrachloroethane-d2/orthodichlorobenzene containing 0.025 M Cr(AcAc)$_3$ as a relaxation agent, to a 0.20 to 0.30 g sample in a Norell 1001-7 10 mm NMR tube. Oxygen is removed by purging the tube with N2 for 1 minute. The samples are dissolved and homogenized by heating the tube and its contents to 120-140° C. using a heating block and vortex mixer. Each sample is visually inspected to ensure homogeneity. The thoroughly mixed samples are not allowed to cool before insertion into the heated NMR sample changer and/or NMR probe.

Data Acquisition Parameters

The data are collected using a Bruker 600 MHz spectrometer equipped with a Bruker 10 mm multinuclear high-temperature CryoProbe. The data are acquired using 1280 transients per data file, a 7.8 sec pulse repetition delay, 90 degree flip angles, and inverse gated decoupling with a sample temperature of 120° C. All measurements are made on non-spinning samples in locked mode. Samples are allowed to thermally equilibrate prior to data acquisition. The $^{13}$C NMR chemical shifts are internally referenced to the EEE triad at 30.0 ppm. The data is processed into a spectrum, appropriate peaks are integrated (quantitating the branches), and then one or more peak integral values are used or averaged for the total branches/1000 C. In the event that no branching is detected, the integrals and signal-to-noise ratio of peaks such as those due to chain ends are used to calculate the limit of detection of the spectrum.

Unsaturation Measurements Using $^1$H NMR

A stock solution (3.26 g) is added to 0.10 to 0.13 g of the polymer sample in a 10 mm NMR tube. The stock solution is either a mixture of tetrachloroethane-d$_2$ (TCE) and perchloroethylene (50:50, w:w) with 0.001M Cr$^{3+}$ or 100% TCE with 0.001M Cr$^{3+}$. The solution in the tube is sparged with N$_2$ for 5 minutes to reduce the amount of oxygen. The sample is dissolved at 120 to 140° C. with periodic vortex mixing. Each $^1$H NMR analysis is run with a 10 mm cryoprobe, at 120° C., on a Bruker AVANCE 600 MHz spectrometer.

Two experiments are run to measure unsaturation: one control and one double presaturation experiment. For the control experiment, the data are processed with an exponential window function with 0.7 Hz line broadening. The signal from residual $^1$H of TCE is set to 100, the integral (I$_{total}$) from about −0.5 to 3 ppm is used as the signal from the whole polymer in the control experiment. The number of total carbons, NC, in the polymer is calculated as follows in Equation 1A:

$$NC = I_{total}/2 \quad \text{(Eqn. 1A)}.$$

For the double presaturation experiment, the data are processed with an exponential window function with 0.7 Hz line broadening, and the baseline is corrected from about 7 to 4 ppm. The signal from residual $^1$H of TCE is set to 100, and the corresponding integrals for unsaturations (I$_{vinylene}$, I$_{trisubstituted}$, I$_{vinyl}$ and I$_{vinylidene}$) are integrated. It is well known to use NMR spectroscopic methods for determining polyethylene unsaturation, for example see Busico, V., et al., *Macromolecules*, 2005, 38, 6988. The number of unsaturation units for vinylene, trisubstituted, vinyl and vinylidene are calculated as follows:

$$N_{vinylene} = I_{vinylene}/2 \quad \text{(Eqn. 2A)},$$

$$N_{trisubstituted} = I_{trisubstitute} \quad \text{(Eqn. 3A)},$$

$$N_{vinyl} = I_{vinyl}/2 \quad \text{(Eqn. 4A)},$$

$$N_{vinylidene} = I_{vinylidene}/2 \quad \text{(Eqn. 5A)}.$$

The unsaturation units per 1,000 total carbons, i.e., all polymer carbons including backbone and branches, are calculated as:

$$N_{vinylene}/1,000\ C = (N_{vinylene}/NC)*1,000 \quad \text{(Eqn. 6A)},$$

$$N_{trisubstituted}/1,000\ C = (N_{trisubstituted}/NC)*1,000 \quad \text{(Eqn. 7A)},$$

$$N_{vinyl}/1,000\ C = (N_{vinyl}/NCH_2)*1,000 \quad \text{(Eqn. 8A)},$$

$$N_{vinylidene}/1,000\ C = (N_{vinylidene}/NC)*1,000 \quad \text{(Eqn. 9A)}.$$

The chemical shift reference is set at 6.0 ppm for the $^1$H signal from residual proton from TCE-d2. The control is run with a ZG pulse, NS=16, DS=2, AQ=1.82 s, D1=14 s (where D1 is the relaxation delay). The double presaturation experiment is run with a modified pulse sequence, with O1P=1.354 ppm, O2P=0.960 ppm, NS=50, AQ=1.82 s, D1=1 s (where D1 is the presaturation time), D13=13 s (where D13 is the relaxation delay).

Crystallization Elution Fractionation

Crystallization Elution Fractionation (CEF) is described by Monrabal et al, *Macromol. Symp.* 257, 71-79 (2007). The instrument is equipped with an IR-4 detector (such as that sold commercially from PolymerChar, Spain) and a two angle light scattering detector Model 2040 (such as those sold commercially from Precision Detectors). The IR-4 detector operates in the compositional mode with two filters: C006 and B057. A 10 micron guard column of 50×4.6 mm (such as that sold commercially from PolymerLabs) is installed before the IR-4 detector in the detector oven. Ortho-dichlorobenzene (ODCB, 99% anhydrous grade) and 2,5-di-tert-butyl-4-methylphenol (BHT) (such as commercially available from Sigma-Aldrich) are obtained. Silica gel 40 (particle size 0.2–0.5 mm) (such as commercially available from EMD Chemicals) is also obtained. The silica gel is dried in a vacuum oven at 160° C. for about two hours before use. Eight hundred milligrams of BHT and five grams of silica gel are added to two liters of ODCB. ODCB containing BHT and silica gel is now referred to as "ODCB." ODCB is sparged with dried nitrogen ($N_2$) for one hour before use. Dried nitrogen is obtained by passing nitrogen at <90 psig over $CaCO_3$ and 5 Å molecular sieves. Sample preparation is done with an autosampler at 4 mg/ml under shaking at 160° C. for 2 hours. The injection volume is 300 μl. The temperature profile of CEF is: crystallization at 3° C./min from 110° C. to 30° C., thermal equilibrium at 30° C. for 5 minutes (including Soluble Fraction Elution Time being set as 2 minutes), and elution at 3° C./min from 30° C. to 140° C. The flow rate during crystallization is 0.052 ml/min. The flow rate during elution is 0.50 ml/min. The data are collected at one data point/second.

The CEF column is packed with glass beads at 125 μm±6% (such as those commercially available from MO-SCI Specialty Products) with ⅛ inch stainless tubing according to US 2011/0015346 A1. The internal liquid volume of the CEF column is between 2.1 and 2.3 mL. Temperature calibration is performed by using a mixture of NIST Standard Reference Material Linear polyethylene 1475a (1.0 mg/ml) and Eicosane (2 mg/ml) in ODCB. The calibration consists of four steps: [(1)]Calculating the delay volume defined as the temperature offset between the measured peak elution temperature of Eicosane minus 30.00° C.; [(2)]Subtracting the temperature offset of the elution temperature from the CEF raw temperature data. It is noted that this temperature offset is a function of experimental conditions, such as elution temperature, elution flow rate, etc.; [(3)]Creating a linear calibration line transforming the elution temperature across a range of 30.00° C. and 140.00° C. such that NIST linear polyethylene 1475a has a peak temperature at 101.00° C., and Eicosane has a peak temperature of 30.00° C., [(4)]For the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

A linear baseline is calculated by selecting two data points: one before the polymer elutes, usually at temperature of 26° C., and another one after the polymer elutes, usually at 118° C. For each data point, the detector signal is subtracted from the baseline before integration.

Some embodiments of the invention will now be described in detail in the following Examples.

EXAMPLES

Polyethylene Composition 1

The following are examples of polyethylene-based compositions that can be used in embodiments of biaxially oriented, multilayer polyethylene films of the present invention, as well as in embodiments of uniaxially oriented, multilayer polyethylene films of the of the present invention. The embodiments of polyethylene-based compositions described in the Examples below utilize Polyethylene Composition 1 and Polyethylene Composition 2. Polyethylene Composition 1 is prepared according to the following process and based on the reaction conditions reported in Table 1.

All raw materials (ethylene monomer) and the process solvent (a narrow boiling range high-purity isoparaffinic solvent, Isopar-E) are purified with molecular sieves before introduction into the reaction environment. Hydrogen is supplied pressurized as a high purity grade and is not further purified. The reactor monomer feed stream is pressurized via a mechanical compressor to above reaction pressure. The solvent feed is pressurized via a pump to above reaction pressure. The individual catalyst components are manually batch diluted to specified component concentrations with purified solvent and pressured to above reaction pressure. All reaction feed flows are measured with mass flow meters and independently controlled with computer automated valve control systems.

The continuous solution polymerization reactors consist of two liquid full, non-adiabatic, isothermal, circulating, loop reactors which mimic continuously stirred tank reactors (CSTRS) with heat removal. Independent control of all fresh solvent, monomer, hydrogen, and catalyst component feeds to each reactor is possible. The total fresh feed streams to each reactor (solvent, monomer, and hydrogen) are temperature controlled by passing the feed stream through a heat exchanger. The total fresh feed to each polymerization reactor is injected into the reactor at two locations per reactor roughly with equal reactor volumes between each injection location. The fresh feed to the first reactor is controlled typically with each injector receiving half of the total fresh feed mass flow. The fresh feed to the second reactor in series is controlled typically to maintain half of the total ethylene mass flow near each injector, and since the non-reacted ethylene from the first reactor enters the second reactor adjacent to the lower pressure fresh feed this injector usually has less than half of the total fresh feed mass flow to the second reactor.

The catalyst/cocatalyst components for each reactor are injected into the polymerization reactor through specially designed injection stingers. Each catalyst/cocatalyst component is separately injected into the same relative location in the reactor with no contact time prior to the reactor. The primary catalyst component is computer controlled to maintain the individual reactor monomer conversion at the specified target. The cocatalyst components are fed based on calculated specified molar ratios to the primary catalyst component.

The catalyst used in the first reactor is zirconium, [[2,2'''-[[bis[1-methylethyl)germylene]bis(methyleneoxy-κO)]bis [3",5,5"-tris(1,1-dimethylethyl)-5'-octyl[1,1':3',1"-terphenyl]-2'-olato-κ0]](2-)]dimethyl-, having the chemical formula $C_{86}H_{128}F_2GeO_4Zr$ and the following structure ("Catalyst 1"):

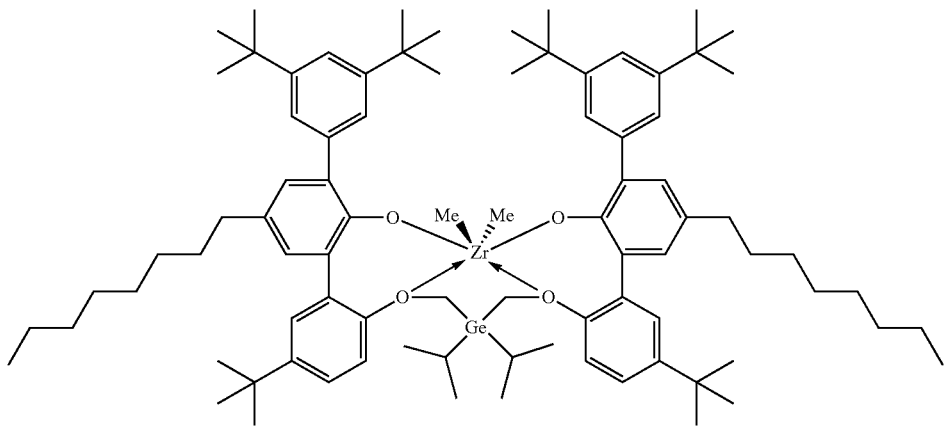

The catalyst used in the second reactor is zirconium, [[2,2'''-[1,3-propanediylbis(oxy-κO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1]-biphenyl]-2-olato-κO]](2-)]dimethyl, having the chemical formula $C_{107}H_{154}N_2O_4Si_2Zr$ and the following structure ("Catalyst 2"):

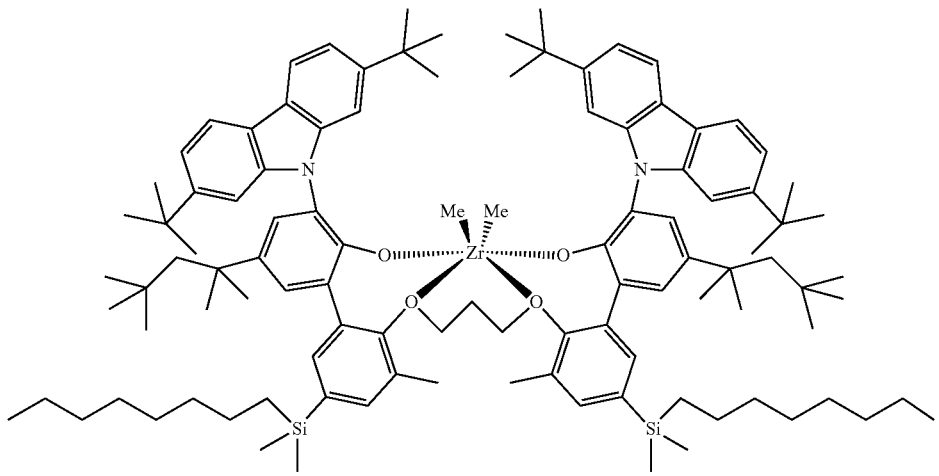

Immediately following each reactor feed injection location, the feed streams are mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified reactor temperature. Circulation around each reactor loop is provided by a pump.

The effluent from the first polymerization reactor (containing solvent, monomer, hydrogen, catalyst components, and dissolved polymer) exits the first reactor loop and passes through a control valve (responsible for controlling the pressure of the first reactor at a specified target) and is injected into the second polymerization reactor of similar design. The final effluent from the second polymerization reactor enters a zone where it is deactivated with the addition of and reaction with a suitable reagent (water). At this same reactor exit location other additives are added for polymer stabilization. This final effluent stream passes through another set of static mixing elements to facilitate the deactivation of the catalyst and dispersion of the additives.

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent is recycled back to the reactor after passing through a purification system. A small amount of solvent is purged from the process. Polyethylene Composition 1 was stabilized with minor (ppm) amounts of stabilizers.

The polymerization conditions for Polyethylene Composition 1 are reported in Table 1. As seen in Table 1, Cocat. 1 (bis(hydrogenated tallow alkyl)methyl, tetrakis(pentafluorophenyl)borate(1-)amine); and Cocat. 2 (modified methyl aluminoxane (MMAO)) are each used as a cocatalyst for Catalyst 1 and Catalyst 2.

Polyethylene Composition 2 is prepared using the same catalyst system as Polyethylene Composition 1, and using the same process with comparable reaction conditions.

Additional properties of Polyethylene Composition 1 and Polyethylene Composition 2 are measured using the Test Methods described above, and are reported in Table 2. The First Polyethylene Fraction refers to the polyethylene component from the first reactor, and the Second Polyethylene Fraction refers to the polyethylene fraction from the second reactor.

TABLE 1

|  | | Polyethylene Composition 1 |
|---|---|---|
| First Reactor Feed Solvent/Ethylene Mass Flow Ratio | g/g | 6.3 |
| First Reactor Feed Hydrogen/Ethylene Mass Flow Ratio | g/g | 1.5E−04 |
| First Reactor Temperature | °C. | 155 |
| First Reactor Pressure | barg | 50 |
| First Reactor Ethylene Conversion | % | 69.4 |
| First Reactor Catalyst Type | Type | Catalyst 1 |
| First Reactor Co-Catalyst 1 Type | Type | Cocat. 1 |
| First Reactor Co-Catalyst 2 Type | Type | Cocat. 2 |
| First Reactor Co-Catalyst 1 to Catalyst Molar Ratio (B to Zr ratio) | Ratio | 1.5 |
| First Reactor Co-Catalyst 2 to Catalyst Molar Ratio (Al to Zr ratio) | Ratio | 12.5 |
| Second Reactor Feed Solvent/Ethylene Mass Flow Ratio | g/g | 2.6 |
| Second Reactor Feed Hydrogen/Ethylene Mass Flow Ratio | g/g | 9.2E−04 |
| Second Reactor Temperature | | 205 |
| Second Reactor Pressure | barg | 50 |
| Second Reactor Ethylene Conversion | % | 91.1 |
| Second Reactor Catalyst Type | Type | Catalyst 2 |
| Second Reactor Co-Catalyst 1 Type | Type | Cocat. 1 |
| Second Reactor Co-Catalyst 2 Type | Type | Cocat. 2 |
| Second Reactor Co-Catalyst 1 to Catalyst Molar Ratio (B to Zr ratio) | mol/mol | 1.8 |
| Second Reactor Co-Catalyst 2 to Catalyst Molar Ratio (Al to Zr ratio) | mol/mol | 22.9 |

TABLE 2

|  | Unit | Polyethylene Composition 1 | Polyethylene Composition 2 |
|---|---|---|---|
| Density | g/cm³ | 0.9668 | 0.9691 |
| $I_2$ | g/10 min | 1.10 | 1.10 |
| $I_{10}/I_2$ | | 13.54 | 15.6 |
| $I_{21}/I_2$ | | 89.8 | 130 |
| Mn (conv.gpc) | g/mol | 11,516 | 10,308 |
| Mw (conv.gpc) | | 112,551 | 113,495 |
| Mz (conv.gpc) | | 423,716 | 441,612 |
| Mw/Mn (conv.gpc) | | 9.77 | 11.01 |
| Mz/Mw (conv.gpc) | | 3.76 | 3.89 |
| Eta* (0.1 rad/s) | Pa · s | 7,921 | 7,934 |
| Eta* (1.0 rad/s) | Pa · s | 6,356 | 6,554 |
| Eta* (10 rad/s) | Pa · s | 3,444 | 3,518 |
| Eta* (100 rad/s) | Pa · s | 1,016 | 1,002 |
| Eta*0.1/Eta*100 | | 7.79 | 7.91 |
| Eta zero | Pa · s | 9,148 | 8,959 |
| Branches (using ¹³C NMR) | Per 1000 total Carbons | <0.03 | <0.03 |
| Non-vinyl Unsaturations (using ¹H NMR) | Per 1,000,000 total Carbons | Not Detected* | Not Detected* |
| ZSVR | | 1.46 | 1.39 |
| First Polyethylene Fraction | | | |
| Wt. % of Polyethylene Composition 1 | % | 35% | 35% |

TABLE 2-continued

|  | Unit | Polyethylene Composition 1 | Polyethylene Composition 2 |
|---|---|---|---|
| Density | g/cm | <0.947 | <0.947** |
| $I_2$ | g/10 minutes | ~0.06 | ~0.06** |
| Second Polyethylene Fraction | | | |
| Wt. % of Polyethylene Composition 1 | % | 65% | 65% |
| Density | g/cm | 0.979 | 0.979 |
| $I_2$ | g/10 minutes | ~700 | ~700 |

*The limit of detection for this measurement was <3.
**Target

The densities of the first polyethylene fraction for Polyethylene Composition 1, the overall Polyethylene Composition 1, and the overall Polyethylene Composition 2 are measured as described above in the Test Methods section. The density of the first polyethylene fraction for Polyethylene Composition 2 is the target value. The density of the second polyethylene fraction is calculated using the following blend rule:

$$\text{Density} = \frac{1}{\left(\frac{\text{Amount of First } PE \text{ Fraction}}{\text{Density of First } PE \text{ Fraction}}\right) + \left(\frac{\text{Amount of Second } PE \text{ Fraction}}{\text{Density of Second } PE \text{ Fraction}}\right)}$$

Additional properties of Polyethylene Composition 1 and Polyethylene Compositions 2 are evaluated and reported in Table 3.

TABLE 3

|  | $M_n$ (conv GPC) | $M_w$ (conv GPC) | $M_z$ (conv GPC) | $M_w/M_n$ (conv GPC) | $M_z/M_w$ (conv GPC) | ZSVR |
|---|---|---|---|---|---|---|
| Polyethylene Composition 1 | 11,516 | 112,551 | 423,716 | 9.77 | 3.76 | 1.46 |
| Polyethylene Composition 2 | 10,308 | 113,495 | 441,612 | 11.01 | 3.89 | 1.39 |

Polyethylene Composition 1 can be dry blended with an Hyperform HPN-20E nucleating agent (Milliken Chemical) provided in a masterbatch to target different final loadings of the HPN-20E nucleating agent ("HPN-20E"). One example of a masterbatch with HPN-20E includes 3 weight percent of HPN-20E, 1.5 weight percent silica, 0.5 weight percent hydrotalcite, 5 weight percent antioxidant, and 90 weight percent of a carrier resin. The carrier resin can be a narrow molecular weight distribution high density polyethylene homopolymer having a density of 0.965 g/cm³ and a melt index ($I_2$) of 8.0 g/10 minutes. The Hyperform HPN-20E comprises ~66 weight percent of calcium salt of 1,2-cyclohexanedicarboxylic acid and ~34 weight percent of zinc stearate/zinc palmitate. For subsequent examples, this masterbatch formed with Hyperform HPN-20E nucleating agent will be referred to as "Nucleating Agent Masterbatch 1."

Similar masterbatches can be formed with Hyperform HPN 210M nucleating agent (Milliken Chemical) to target different final loadings of the HPN 210M nucleating agent ("HPN 210M"). One example of a masterbatch with HPN 210 includes 3 weight percent of HPN 210M, 1.5 weight percent silica, 0.5 weight percent hydrotalcite, 5 weight percent antioxidant, and 90 weight percent of a carrier resin. The carrier resin can be a narrow molecular weight distribution high density polyethylene homopolymer having a density of 0.965 g/cm³ and a melt index ($I_2$) of 8.0 g/10 minutes. For subsequent examples, this masterbatch formed with Hyperform HPN 210M nucleating agent will be referred to as "Nucleating Agent Masterbatch 2."

Example 1

The following are examples of inventive oriented, multilayer polyethylene films that can be produced according to embodiments of the present invention.

In these Examples, three-layer oriented polyethylene films can be produced using a 3 layer 2.1 meter wide Biax Pilot line The films can be produced using a 3 layer die with a die gap of 3.1 mm, cast on a chill drum using an air knife pinner. The films can be stretched at a 6:1 draw ratio in the machine direction through a series of heated and differentially sped rolls, followed by stretching in the transverse direction at a 8:1 draw ratio. Additional information on the fabrication of these films is provided below.

A multilayer film with a width of 250 mm may be coextruded at processing temperatures of approximately 225° C. to 260° C. through a three layer die and cast onto a cooling drum whose surface temperature may be controlled between 25° C. and 50° C. to solidify the non-oriented film at a casting speed of about 4-6 meters per minute. The non-oriented film may be preheated in the machine direction during stretching at about 75° C. to 125° C., stretched in the machine direction at about 100° C. to 145° C. at a stretching ratio of about 6 times the original length. The resulting stretched sheet may be annealed at about 20° C. to 110° C. to reduce heat shrinkage and to obtain a uniaxially oriented film. The uniaxially oriented film may be introduced into a tenter at a line speed of approximately 25 to 30 meters per minute, preliminarily heated between about 115° C. and 145° C., stretched in the transverse direction at about 110° C. to 145° C. at a stretching ratio of about 8 times the original width, and then heat-set or annealed at about 105° C. to 135° C. to reduce internal stresses due to the orientation, to minimize thermal shrinkage of the final film, and to give a relatively thermally stable biaxially oriented film. After biaxial orientation, the thickness of the coextruded film overall is nominally 18 microns; the outside layers are 3.5 micrometer each. The biaxially oriented multi-layer film may be wound in roll form. The machine direction orientation relaxation ratio may be between 3-5%, the transverse direction orientation relaxation ratio may be between 3-6%.

The films have the following structure A/B/C having the following respective thicknesses: 3.5 microns/11 microns/3.5 microns. Layer B is the core layer, and the A and C layers include both skin and sub-skin layers of the 5 layer film stretching line. With a final width of 1.1 m Inventive Films 1-9 are shown in Table 3:

TABLE 3

| | Outer Layer (Layer A) | Inner Layer (Layer B) | Outer Layer (Layer C) |
| --- | --- | --- | --- |
| Inventive Film 1 | INNATE ™ XUS59910.08 | 70% Polyethylene Composition 1 30% INNATE ™ XUS59910.08 | 96% INNATE ™ XUS59910.08 2% Antiblock 2% Slip Agent |
| Inventive Film 2 | INNATE ™ XUS59910.08 | 70% Polyethylene Composition 2 30% INNATE ™ XUS 59910.08 | 96% INNATE ™ XUS59910.08 2% Antiblock 2% Slip Agent |
| Inventive Film 3 | INNATE ™ XUS59910.08 | 70% Polyethylene Composition 1 30% INNATE ™ XUS 59910.08 1000 ppm Hyperform HPN-20E | 96% INNATE ™ XUS59910.08 2% Antiblock 2% Slip Agent |
| Inventive Film 4 | INNATE ™ XUS59910.08 | 70% Polyethylene Composition 1 30% INNATE ™ XUS 59910.08 1000ppm Hyperform HPN 210M | 96% INNATE ™ XUS59910.08 2% Antiblock 2% Slip Agent |
| Inventive Film 5 | Polyethylene Composition 1 | Polyethylene Composition 1 1000 ppm Hyperform HPN 210M | 96% INNATE ™ XUS59910.08 2% Antiblock 2% Slip Agent |
| Inventive Film 6 | Polyethylene Composition 1 | Polyethylene Composition 1 1000 ppm Hyperform HPN 210M | 96% AFFINITY ™ 1880 2% Antiblock 2% Slip Agent |
| Inventive Film 7 | INNATE ™ XUS59910.08 | Polyethylene Composition 1 1000 ppm Hyperform HPN 210M | 96% AFFINITY ™ 1880 2% Antiblock 2% Slip Agent |
| Inventive Film 8 | INNATE ™ XUS59910.08 | Polyethylene Composition 1 500 ppm Hyperform HPN 210M | 96% AFFINITY ™ 1880 2% Antiblock 2% Slip Agent |
| Inventive Film 9 | INNATE ™ XUS59910.08 | Polyethylene Composition 1 2000 ppm Hyperform HPN 210M | 96% AFFINITY ™ 1880 2% Antiblock 2% Slip Agent |

INNATE™ XUS59910.08 is a polyethylene having a density of 0.926 g/cm³ and a melt index ($I_2$) of 1.7 g/10 minutes that is commercially available from The Dow Chemical Company. AFFINITY™ 1880 is a polyolefin plastomer having a density of 0.902 g/cm³ and a melt index ($I_2$) of 1 g/10 minutes that is commercially available from The Dow Chemical Company. In general, persons having ordinary skill in the art can identify a variety of antiblocks and slip agents that can be used in Layer C based on the teachings herein. One example of an Antiblock that can be used is CON-X AB 601 PE which is commercially available from Kafrit Group. One example of a Slip Agent that can be used is CON-X SL 504 PE which is commercially available from Kafrit Group.

In some embodiments, after extrusion, rather than being biaxially oriented, the films can be oriented only in the machine direction to provide a uniaxially oriented film. For example, the films can be oriented in the machine direction using a Windmoeller & Hoelscher MDO filming stretching unit at the following temperatures: Preheat from 75° C. to 115° C. (75° C. for Preheat 1 and 115° C. for Preheat 2); Stretching at 125-145° C.; Annealing at 105° C.; Cooling at 45-75° C. (e.g., 70° C.). The stretching ratio in the machine direction can be at a draw ratio of 4:1 to 20:1 (e.g., 4:1 to 16:1, or 4:1 to 12:1, or 4:1 to 10:1, or 4:1 to 9:1).

That which is claimed:

1. A biaxially oriented, multilayer polyethylene film comprising:
   at least one layer comprising:
   (1) a polyethylene-based composition that comprises:
      (a) at least 97% by weight, based on the total weight of the polyethylene-based composition, of a polyethylene composition comprising:
         (i) from 25 to 37 percent by weight of a first polyethylene fraction having a density in the range of 0.935 to 0.947 g/cm$^3$ and a melt index ($I_2$) of less than 0.1 g/10 minutes; and
         (ii) from 63 to 75 percent by weight of a second polyethylene fraction; and
      (b) 20 to 5000 ppm, based on the total weight of the polyethylene-based composition of a nucleating agent, wherein the nucleating agent comprises a calcium salt of 1,2-cyclohexanedicarboxylic acid or sodium 4-[(4-chlorobenzoyl) amino] benzoate; wherein the polyethylene composition has less than 0.10 branches per 1,000 carbon atoms when measured using $^{13}$C NMR, wherein the density of the polyethylene-based composition is at least 0.965 g/cm$^3$, and wherein the melt index ($I_2$) of the polyethylene-based composition is 0.5 to 10 g/10 minutes.

2. The film of claim 1, wherein the film is oriented in the machine direction at a draw ratio from 2:1 to 9:1 and in the cross direction at a draw ratio from 2:1 to 11:1.

3. The film of claim 1, further comprising a second polyethylene composition, wherein the second polyethylene composition exhibits at least two local peaks, excluding the soluble fraction, in comonomer distribution measured by crystallization elution fractionation, wherein one of the peaks is between 40° C. and 95° C.

4. The film of claim 3, wherein the layer comprising the polyethylene-based composition further comprises the second polyethylene composition.

5. The film of claim 1, wherein the overall density is from 0.931 to 0.975 g/cm$^3$.

6. The film of claim 1, wherein the film has a thickness of 5 to 50 microns.

7. The film of claim 1, further comprising a layer that comprises polyamide or ethylene vinyl alcohol.

8. The film of claim 1, wherein an outer layer is a sealant layer.

9. The film of claim 1, further comprising a layer comprising a metal deposited on an outer layer of the film, wherein the metal comprises Al, Zn, Au, Ag, Cu, Ni, Cr, Ge, Se, Ti, Sn, Si, Mg, or oxides thereof.

10. An article comprising the film of claim 1.

11. A laminate comprising:
    a first film comprising a polyethylene sealant film, polyethylene terephthalate, polypropylene, or polyamide; and
    an oriented, multilayer polyethylene film according to claim 1, wherein the first film is laminated to the multilayer polyethylene film.

12. A uniaxially oriented, multilayer polyethylene film comprising:
    at least one layer comprising:
    (1) a polyethylene-based composition that comprises:
       (a) at least 97% by weight, based on the total weight of the polyethylene-based composition, of a polyethylene composition comprising:
          (i) from 25 to 37 percent by weight of a first polyethylene fraction having a density in the range of 0.935 to 0.947 g/cm$^3$ and a melt index ($I_2$) of less than 0.1 g/10 minutes; and
          (ii) from 63 to 75 percent by weight of a second polyethylene fraction; and
       (b) 20 to 5000 ppm, based on the total weight of the polyethylene-based composition of a nucleating agent, wherein the nucleating agent comprises a calcium salt of 1,2-cyclohexanedicarboxylic acid or sodium 4-[(4-chlorobenzoyl) amino] benzoate; wherein the polyethylene composition has less than 0.10 branches per 1,000 carbon atoms when measured using $^{13}$C NMR, wherein the density of the polyethylene-based composition is at least 0.965 g/cm$^3$, and wherein the melt index ($I_2$) of the polyethylene-based composition is 0.5 to 10 g/10 minutes.

13. The film of claim 12, wherein the film is oriented in the machine direction at a draw ratio from 4:1 to 20:1.

14. The film of claim 12, further comprising a second polyethylene composition, wherein the second polyethylene composition exhibits at least two local peaks, excluding the soluble fraction, in comonomer distribution measured by crystallization elution fractionation, wherein one of the peaks is between 40° C. and 95° C.

15. The film of claim 14, wherein the layer comprising the polyethylene-based composition further comprises the second polyethylene composition.

16. The film of claim 12, wherein the overall density is from 0.931 to 0.975 g/cm$^3$.

17. The film of claim 12, wherein the film has a thickness of 5 to 50 microns.

18. The film of claim 12, further comprising a layer that comprises polyamide or ethylene vinyl alcohol.

19. The film of claim 12, wherein an outer layer is a sealant layer.

20. The film of claim 12, further comprising a layer comprising a metal deposited on an outer layer of the film, wherein the metal comprises Al, Zn, Au, Ag, Cu, Ni, Cr, Ge, Se, Ti, Sn, Si, Mg, or oxides thereof.

* * * * *

UNITED STATES PATENT AND TRADEMARK OFFICE
CERTIFICATE OF CORRECTION

PATENT NO. : 12,145,344 B2
APPLICATION NO. : 17/754753
DATED : November 19, 2024
INVENTOR(S) : Karlheinz Hausmann et al.

Page 1 of 1

It is certified that error appears in the above-identified patent and that said Letters Patent is hereby corrected as shown below:

On the Title Page

(87) Publication data of the international application:
PCT Pub. No. should read: WO2021/118739
PCT Pub. Date should read: Jun. 17, 2021

Signed and Sealed this
Twenty-ninth Day of April, 2025

Coke Morgan Stewart
*Acting Director of the United States Patent and Trademark Office*